US012779917B2

(12) United States Patent
Stout, II et al.

(10) Patent No.: US 12,779,917 B2
(45) Date of Patent: Nov. 3, 2026

(54) HUMAN MACHINE INTERFACE FOR SELF PROPELLED TRAILER SYSTEMS

(71) Applicant: FCA US LLC, Auburn Hills, MI (US)

(72) Inventors: Mark E Stout, II, Waterford, MI (US); Travis D Bechtel, Goodrich, MI (US); Brandon Brady, Lapeer, MI (US); Mac Lynch, Waterford, MI (US)

(73) Assignee: FCA US LLC, Auburn Hills, MI (US)

( * ) Notice: Subject to any disclaimer, the term of this patent is extended or adjusted under 35 U.S.C. 154(b) by 202 days.

(21) Appl. No.: 18/344,995

(22) Filed: Jun. 30, 2023

(65) Prior Publication Data

US 2024/0151547 A1 May 9, 2024

Related U.S. Application Data

(60) Provisional application No. 63/423,218, filed on Nov. 7, 2022.

(51) Int. Cl.
*G06F 17/00* (2019.01)
*B60D 1/07* (2006.01)
(Continued)

(52) U.S. Cl.
CPC ............. *B60W 60/001* (2020.02); *B60D 1/07* (2013.01); *B60D 1/245* (2013.01); *B60D 1/249* (2013.01);
(Continued)

(58) Field of Classification Search
CPC .... B60W 60/001; B60W 10/08; B60W 10/18; B60W 10/20; B60W 30/09; B60W 50/14; B60W 60/0015; B60W 30/18036; B60W 2300/14; B60W 2420/403; B60W 2420/54; B60W 2520/06; B60W 2520/10;
(Continued)

(56) References Cited

U.S. PATENT DOCUMENTS 9,610,975 B1 * 4/2017 Hu .......................... B60D 1/06
9,796,228 B2 * 10/2017 Hu .......................... G06V 20/56
(Continued)

FOREIGN PATENT DOCUMENTS

CN 115087588 A * 9/2022 ......... B62D 53/0864
DE 102018130426 A1 * 6/2020
(Continued)

OTHER PUBLICATIONS

US20160062583A1 (Year: 2016).*

*Primary Examiner* — Ronnie M Mancho
(74) *Attorney, Agent, or Firm* — Jeremy J. Klobucar

(57) ABSTRACT

A human machine interface (HMI) system for a multi-vehicle system having a lead vehicle and a trailer vehicle with independent propulsion and control includes a display disposed in the lead vehicle, a lead vehicle sensor suite, a trailer vehicle sensor suite, and a controller in signal communication with the display, the lead vehicle sensor suite, and the trailer vehicle sensor suite. The controller is programmed to generate a trailer mode screen on the display when the trailer vehicle is connected to the lead vehicle. The trailer mode screen includes (i) a trailer top view section providing a top-view graphical representation of the multi-vehicle system, and (ii) a trailer enhanced view section providing a 3D dynamic representation of the multi-vehicle system.

20 Claims, 18 Drawing Sheets

(51) Int. Cl.

| | |
|---|---|
| ***B60D 1/24*** | (2006.01) |
| ***B60D 1/32*** | (2006.01) |
| ***B60D 1/44*** | (2006.01) |
| ***B60D 1/62*** | (2006.01) |
| ***B60L 50/60*** | (2019.01) |
| ***B60R 1/23*** | (2022.01) |
| ***B60R 1/26*** | (2022.01) |
| ***B60W 10/08*** | (2006.01) |
| ***B60W 10/18*** | (2012.01) |
| ***B60W 10/20*** | (2006.01) |
| ***B60W 30/09*** | (2012.01) |
| ***B60W 50/14*** | (2020.01) |
| ***B60W 60/00*** | (2020.01) |
| ***B62D 13/00*** | (2006.01) |
| ***B62D 13/06*** | (2006.01) |
| ***B62D 15/02*** | (2006.01) |
| ***B62D 53/08*** | (2006.01) |
| ***B62D 59/04*** | (2006.01) |
| ***G01C 21/34*** | (2006.01) |
| ***G01C 21/36*** | (2006.01) |
| ***G07C 5/02*** | (2006.01) |
| ***G07C 5/08*** | (2006.01) |
| *B60D 1/26* | (2006.01) |
| *B60K 35/00* | (2006.01) |
| *B60K 35/10* | (2024.01) |
| *B60K 35/28* | (2024.01) |
| *B60W 30/18* | (2012.01) |

(52) U.S. Cl.

CPC ................. *B60D 1/32* (2013.01); *B60D 1/44* (2013.01); *B60D 1/62* (2013.01); *B60L 50/60* (2019.02); *B60R 1/23* (2022.01); *B60R 1/26* (2022.01); *B60W 10/08* (2013.01); *B60W 10/18* (2013.01); *B60W 10/20* (2013.01); *B60W 30/09* (2013.01); *B60W 50/14* (2013.01); *B60W 60/0015* (2020.02); *B62D 13/00* (2013.01); *B62D 13/005* (2013.01); *B62D 13/06* (2013.01); *B62D 15/021* (2013.01); *B62D 15/0275* (2013.01); *B62D 53/0864* (2013.01); *B62D 59/04* (2013.01); *G01C 21/3461* (2013.01); *G01C 21/3647* (2013.01); *G07C 5/02* (2013.01); *G07C 5/0825* (2013.01); *B60D 1/248* (2013.01); *B60D 1/26* (2013.01); *B60K 35/00* (2013.01); *B60K 35/10* (2024.01); *B60K 35/28* (2024.01); *B60K 2360/119* (2024.01); *B60K 2360/128* (2024.01); *B60K 2360/167* (2024.01); *B60K 2360/178* (2024.01); *B60L 2200/28* (2013.01); *B60R 2300/105* (2013.01); *B60R 2300/8093* (2013.01); *B60W 30/18036* (2013.01); *B60W 2300/14* (2013.01); *B60W 2420/403* (2013.01); *B60W 2420/54* (2013.01); *B60W 2520/06* (2013.01); *B60W 2520/10* (2013.01); *B60W 2520/22* (2013.01); *B60W 2520/28* (2013.01); *B60W 2552/53* (2020.02); *B60W 2556/45* (2020.02); *B60W 2710/18* (2013.01); *B60W 2710/20* (2013.01); *B60W 2720/106* (2013.01); *B62D 15/029* (2013.01)

(58) Field of Classification Search

CPC ......... B60W 2520/22; B60W 2520/28; B60W 2552/53; B60W 2556/45; B60W 2710/18; B60W 2710/20; B60W 2720/106; B60W 50/00; B60W 50/0098; B60D 1/07; B60D 1/245; B60D 1/249; B60D 1/32; B60D 1/44; B60D 1/62; B60D 1/248; B60D 1/26; B60D 1/06; B60D 1/145; B60L 50/60; B60L 2200/28; B60R 1/23; B60R 1/26; B60R 2300/105; B60R 2300/8093; B60R 1/00; B62D 13/00; B62D 13/005; B62D 13/06; B62D 15/021; B62D 15/0275; B62D 53/0864; B62D 59/04; B62D 15/029; G01C 21/3461; G01C 21/3647; G07C 5/02; G07C 5/0825; B60K 35/00; B60K 35/10; B60K 35/28; B60K 2360/119; B60K 2360/128; B60K 2360/167; B60K 2360/178

USPC .......................................................... 701/523

See application file for complete search history.

(56) References Cited

U.S. PATENT DOCUMENTS

| | | | | |
|---|---|---|---|---|
| 9,827,818 | B2 * | 11/2017 | Hu | G06F 18/22 |
| 10,023,229 | B2 * | 7/2018 | Lavoie | B62D 13/06 |
| 10,870,449 | B2 * | 12/2020 | Gieseke | B62D 13/06 |
| 10,884,425 | B2 * | 1/2021 | Li | G05D 1/0231 |
| 11,420,678 | B2 * | 8/2022 | Maruoka | B62D 15/029 |
| 11,834,096 | B2 * | 12/2023 | Robertson | B60D 1/62 |
| 11,926,381 | B2 * | 3/2024 | Vilca | B60W 60/001 |
| 11,945,530 | B2 * | 4/2024 | Yang | B60L 15/2009 |
| 11,993,261 | B2 * | 5/2024 | Jumpertz | G05D 1/0295 |
| 12,037,016 | B2 * | 7/2024 | Deragården | B60W 60/0015 |
| 12,049,251 | B2 * | 7/2024 | Goodarzi | B62D 53/005 |
| 2014/0058668 | A1 * | 2/2014 | Trombley | B60R 1/26<br>701/523 |
| 2021/0122415 | A1 * | 4/2021 | Critchley | B62D 6/002 |
| 2021/0403087 | A1 * | 12/2021 | Mayer | B62D 15/027 |
| 2022/0126714 | A1 | 4/2022 | Bucknor et al. | |
| 2022/0250680 | A1 * | 8/2022 | Goodarzi | B60D 1/30 |
| 2022/0281522 | A1 * | 9/2022 | Robertson | B60D 1/245 |
| 2022/0289207 | A1 * | 9/2022 | Kraeling | H04W 4/46 |
| 2023/0311873 | A1 * | 10/2023 | Bolf | B60D 1/62<br>701/23 |
| 2024/0149791 | A1 * | 5/2024 | Bechtel | B60R 1/26 |
| 2024/0149908 | A1 * | 5/2024 | Stout | B60D 1/62 |
| 2024/0149910 | A1 * | 5/2024 | Stout, II | B60D 1/06 |
| 2024/0149914 | A1 * | 5/2024 | Stout | B62D 13/00 |
| 2024/0149961 | A1 * | 5/2024 | Stout | B60R 1/26 |
| 2024/0151547 | A1 * | 5/2024 | Stout | B60W 10/08 |
| 2024/0351585 | A1 * | 10/2024 | Stout | B60W 10/18 |
| 2024/0408977 | A1 * | 12/2024 | Yhr | B60L 53/57 |

FOREIGN PATENT DOCUMENTS

| | | | | | |
|---|---|---|---|---|---|
| DE | 102021206404 | A1 * | 12/2021 | | B60R 1/00 |
| WO | WO-2018207427 | A1 * | 11/2018 | | B62D 13/06 |

* cited by examiner

HUMAN MACHINE INTERFACE FOR SELF PROPELLED TRAILER SYSTEMS

CROSS-REFERENCE TO RELATED APPLICATION

This application claims the benefit of U.S. Provisional Pat. App. No. 63/423,218 filed Nov. 7, 2022, the contents of which are incorporated herein by reference thereto.

FIELD

The present application relates generally to human machine interface systems for vehicles and, more particularly, to human machine interface systems for vehicles integrated with self-propelled trailer systems.

BACKGROUND

Trailer towing is a complex task that typically requires significant driver attention and skill. Traditional tow vehicles display limited information about the state of the trailer to the driver, such as trailer length, brake gain, tire pressure, distance towed, and tongue weight. Some trailering systems allow various trailer controls to be adjusted by the driver. However, this information and control are limited because the possible configurations and interventions for a traditional trailer are limited. Accordingly, while such conventional trailer systems work well for their intended purpose, there is a desire for improvement in the relevant art.

SUMMARY

In accordance with an example aspect of the invention, a human machine interface (HMI) system for a multi-vehicle system having a lead vehicle and a trailer vehicle with independent propulsion and control is provided. In one example implementation, the HMI system includes a display disposed in the lead vehicle, a lead vehicle sensor suite, a trailer vehicle sensor suite, and a controller in signal communication with the display, the lead vehicle sensor suite, and the trailer vehicle sensor suite. The controller is programmed to generate a trailer mode screen on the display when the trailer vehicle is connected to the lead vehicle. The trailer mode screen includes (i) a trailer top view section providing a top-view graphical representation of the multi-vehicle system, and (ii) a trailer enhanced view section providing a 3D dynamic representation of the multi-vehicle system.

In addition to the foregoing, the described HMI system may include one or more of the following: wherein the top-view graphical representation and the 3D dynamic representation show a representation of a position of the trailer vehicle relative to the lead vehicle; wherein the top-view graphical representation includes a battery level of the lead vehicle based on signals from the lead vehicle sensor suite, and a battery level of the trailer vehicle based on signals from the trailer vehicle sensor suite; wherein the trailer enhanced view section shows a representation of surrounding vehicles and lane markers; and wherein the trailer mode screen further includes (iii) a trailer information section showing a lead vehicle steering angle based on signals from the lead vehicle sensor suite, and a trailer steering angle based on signals from the trailer vehicle sensor suite.

In addition to the foregoing, the described HMI system may include one or more of the following: wherein the trailer mode screen further includes a settings icon, whereupon selected of the settings icon, the controller is configured to generate a trailer settings page, wherein the trailer settings page provides a driver profile section to select a driver trailering skill; wherein the driver profile section provides options to select a novice profile, an intermediate profile, and an expert profile, wherein the controller is configured to provide various levels of information to the display based on the driver profile selection; and wherein the trailer mode screen includes a sub-menu section providing sub-menu navigation buttons.

In addition to the foregoing, the described HMI system may include one or more of the following: wherein the sub-menu navigation buttons include a trailer live overview button, a trailer info button, a lights check button, and a cameras button; wherein upon selection of the trailer live overview button, the controller is configured to generate a trailer live overview page providing the trailer top view section, the trailer enhanced view section, and a trailer information section showing a lead vehicle steering angle and a trailer steering angle; and wherein upon selection of the trailer info button, the controller is configured to generate a trailer info page providing a graphical representation of the trailer vehicle, a trailer tire pressure, a trailer brake, a trailer transmission oil temperature, a trailer odometer, a trailer tow/haul status, and an electronic range select.

In addition to the foregoing, the described HMI system may include one or more of the following: wherein upon selection of the lights check button, the controller is configured to generate a light check page that displays a soft button to activate a trailer light check, and a light check status field; wherein upon selection of the cameras button, the controller is configured to generate a camera page providing (a) a trailer top view section with a graphical representation of the multi-vehicle system, and a plurality of camera icons corresponding to locations and orientations of cameras of the lead vehicle sensor suite and the trailer vehicle sensor suite, and (b) a camera view section configured to display a view of one or more of the cameras when one or more of the corresponding camera icons is selected; and wherein the trailer top view section is configured to display one or more warning icons when an object is detected by an ADAS system of the trailer vehicle sensor suite.

In addition to the foregoing, the described HMI system may include one or more of the following: wherein the trailer top view section is configured to display an obstacle detection perimeter around the graphical representation of the multi-vehicle system, based on signals from an ADAS system of the lead vehicle sensor suite, and an ADAS system of the trailer vehicle sensor suite, wherein the obstacle detection perimeter moves dynamically according to the present of detected obstacles; and wherein the controller is configured to operate in a lane bias condition scenario, including (i) detecting, with the trailer vehicle sensor suite, unused later space within a lane of travel of the trailer vehicle, (ii) generating, on the display, a message indicating a lane bias maneuver may be performed, and (iii) executing, by the controller, the lane bias maneuver to steer the trailer vehicle relative to the lead vehicle to utilize the unused lateral space.

In addition to the foregoing, the described HMI system may include one or more of the following: wherein the controller is configured to operate in a delayed turn scenario, including (i) detecting, by a navigation system of the lead vehicle, the multi-vehicle system will be performing a turning maneuver, and (ii) generating, on the trailer enhanced view section, a ghost vehicle representing a suggested path for the lead vehicle to perform the turning maneuver, wherein the suggested path is a delayed turning maneuver to avoid obstacles when turning with the trailer vehicle; and wherein the controller is configured to operate in a reversing maneuver scenario, including (i) detecting a reverse gear of the lead vehicle is engaged, and (ii) displaying the trailer top view section, which provides the top-view graphical representation of the multi-vehicle system with (a) graphical trailer wheels representing an actual orientation of wheels of the trailer vehicle, (b) steering lines showing a path of the trailer vehicle based on the orientation of the trailer wheels, and (c) a graphic indicating a direction to turn the lead vehicle.

In addition to the foregoing, the described HMI system may include one or more of the following: wherein the controller is configured to operate in a jackknife condition scenario, including (i) detecting a potential jackknife condition, (ii) generating, on the display, a message indicating the potential jackknife condition, and a timeout bar showing allowed elapsed time or distance the multi-vehicle system can travel before an elevated jackknife condition occurs, and (iii) generating, on the display, a warning of a jackknife condition when the timeout bar expires.

In addition to the foregoing, the described HMI system may include one or more of the following: wherein the controller is in signal communication with a tow bar system connecting the lead vehicle and the trailer vehicle, the tow bar system including (i) at least one angle sensor configured to sense a first angle between the lead vehicle and the tow bar system, and a second angle between the trailer system and the tow bar system, (ii) an extension sensor configured to measure a level of extension of the tow bar system, and (iii) a load cell configured to sense forces on the tow bar system. The controller is in signal communication with the at least one angle sensor, the extension sensor, and the load cell.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein are human machine interface (HMI) systems for lead vehicles configured to integrate with and tow self-propelled, battery electric vehicle (BEV) based trailer systems. The BEV trailers may be, for example, a wagon style (e.g., wheels at four corners) or traditional chassis trailer with a steerable axle such as those shown in FIGS. 1-4. Additionally, the BEV trailers may utilize a tow bar system such as that shown and described in FIGS. 5-7. The HMI control systems enable the lead vehicle and/or trailer to perform various maneuvers such as, for example, forward, reverse and corner entry maneuvers. Example systems/maneuvers are described in commonly owned U.S. patent application Ser. No. 18/190,588, filed Mar. 27, 2023 and U.S. patent application Ser. No. 18/308,836, filed Apr. 28, 2023, the entire contents of which are incorporated herein by reference thereto.

As described herein, the HMI control systems enable drivers of varying skill levels, from novice to expert, to safely operate and tow a self-propelled trailer through a suite of maneuvers, sensors, and algorithms. Additional degrees of freedom provided by the optional tow bar system allows the trailer control system to intelligently select its path of travel in a way that avoids obstacles and improves user comfort. Example trailer systems are described in FIGS. 1-7. Example self-powered BEV trailer control systems are described in FIGS. 8 and 9. Example HMI systems for operating the lead vehicle and trailer vehicle are described in FIGS. 10-20.

Figure 1:
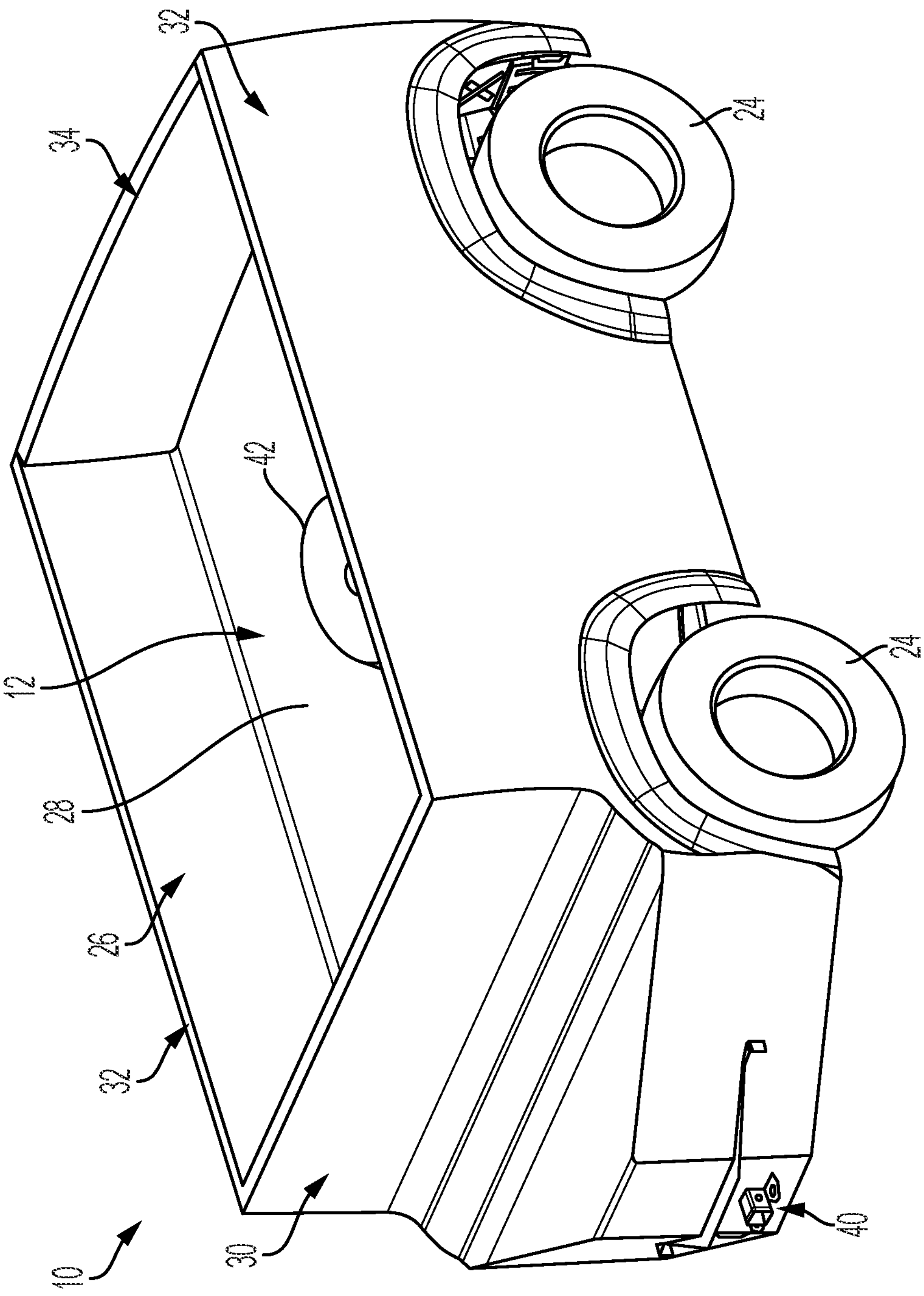
FIG. 1 is a perspective view of an example dolly platform system with independent propulsion and control, in accordance with the principles of the present application.
Figure 2:
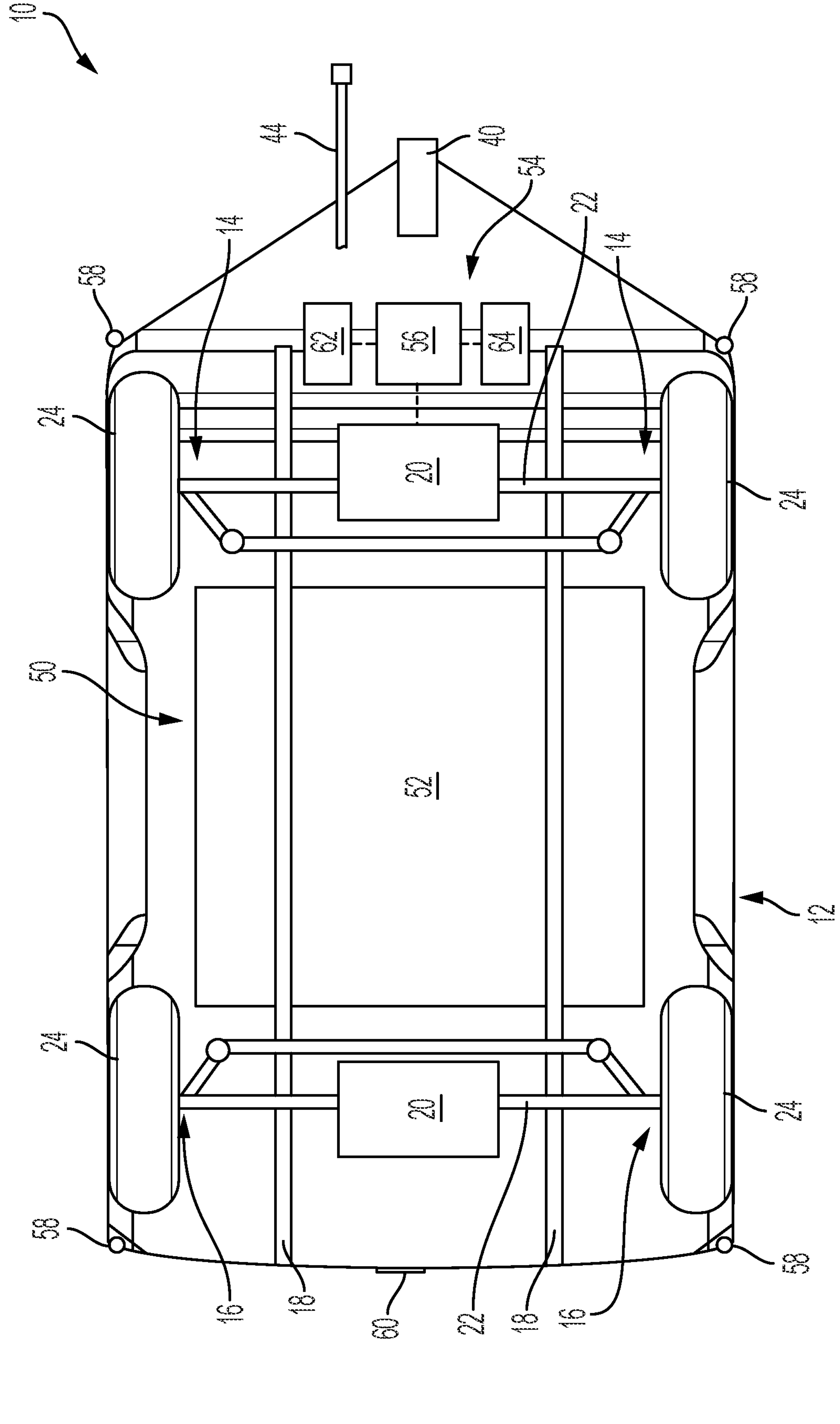
FIG. 2 is a bottom view of the dolly platform system shown in FIG. 1, in accordance with the principles of the present application.

With reference now to FIGS. 1 and 2, a trailer supporting dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and braking to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuverable for utility uses such as dumping mulch, collecting/moving firewood, waste/dumpster disposal, etc.

In the example embodiments, the dolly system is configured to support the weight of any type of trailer hitch and acts as an intermediary between the lead vehicle and the trailer. The intermediate body creates backwards compatibility between EVs and older trailers without their own power source. Onboard batteries improve range of the EV/trailer, and allow a smaller lead vehicle to tow a large trailer by handling most or all of the braking and accelerating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel efficient vehicle that suits daily use needs.

The dolly system described herein advantageously provides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, differential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connection 44 is configured to electrically couple to a corresponding connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is configured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

Figure 3:
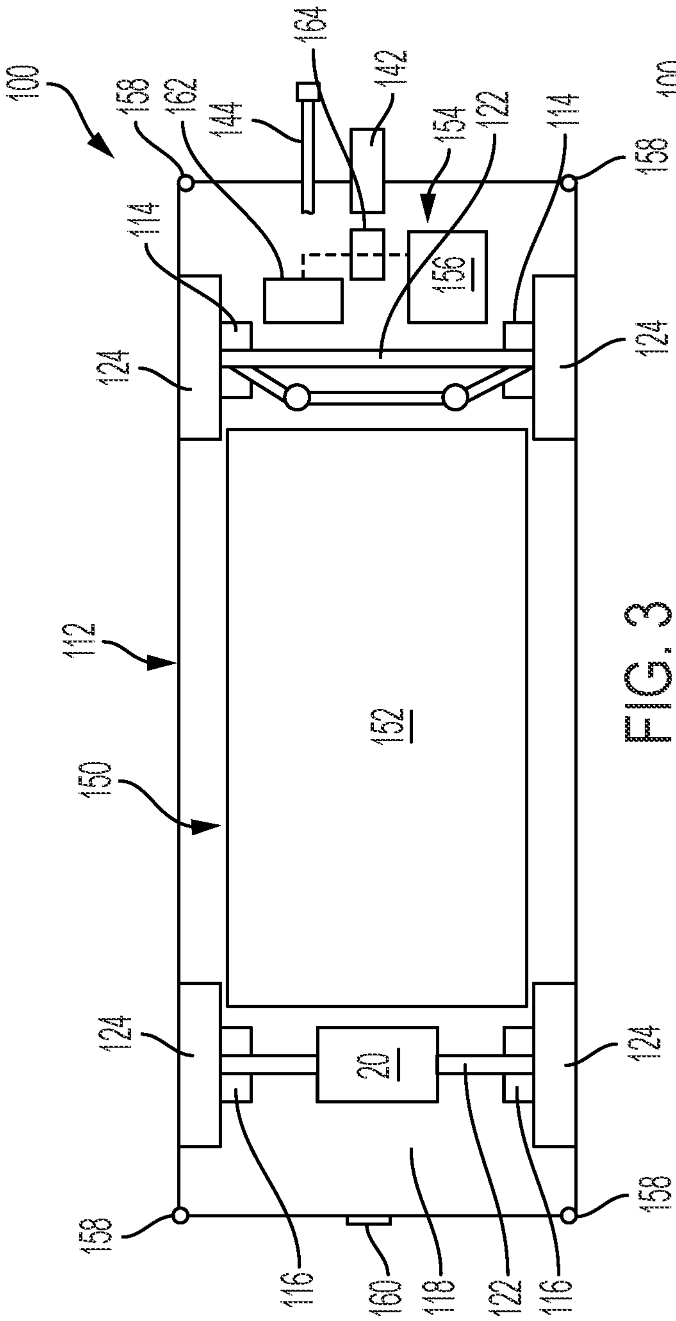
FIG. 3 is a bottom view of an example trailer platform system in accordance with the principles of the present application.
Figure 4:
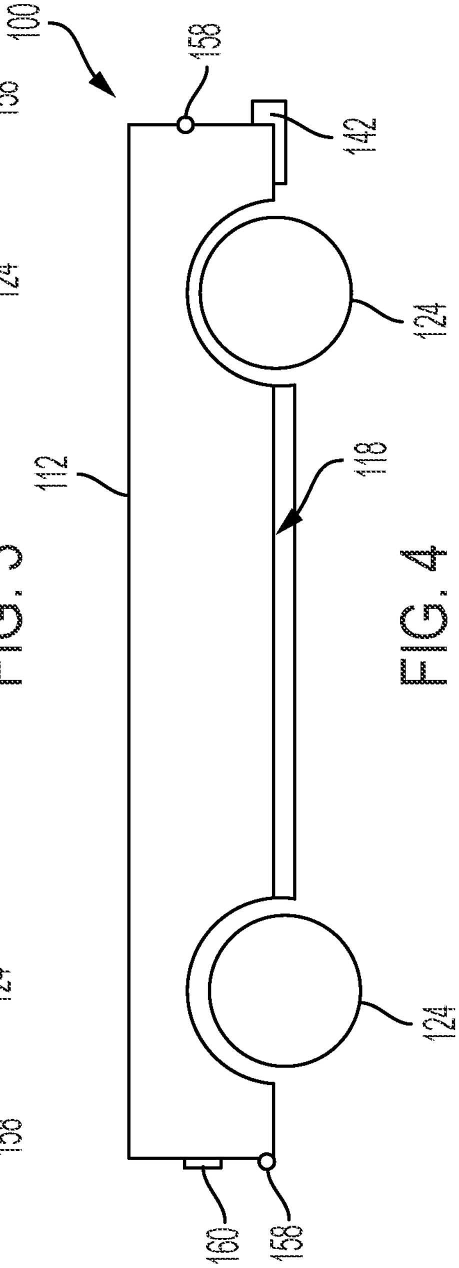
FIG. 4 is a side view of the trailer platform system shown in FIG. 3, in accordance with the principles of the present application.

With reference now to FIGS. 3 and 4, a trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s) 122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

Figure 5:
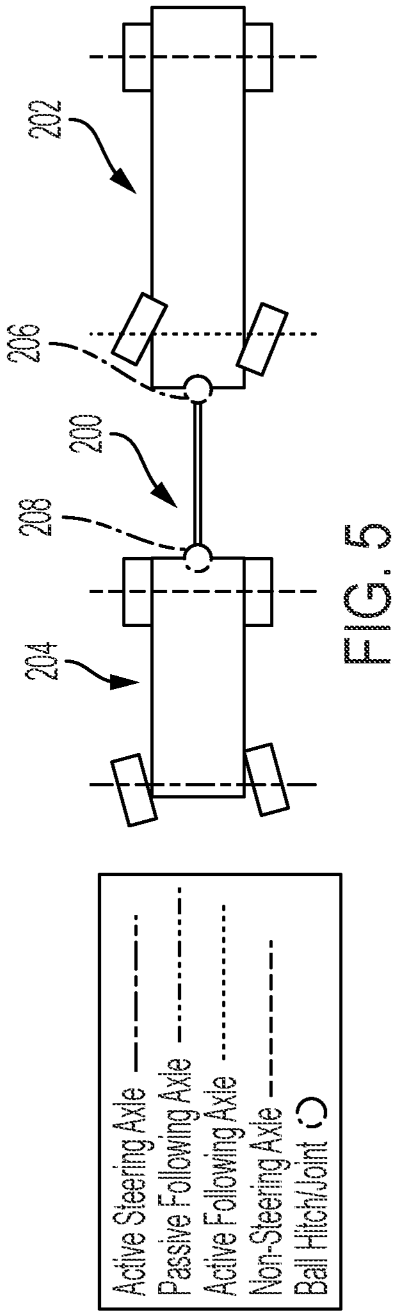
FIG. 5 is a schematic illustration of an example tow bar system connecting a lead vehicle and a trailing vehicle, in accordance with the principles of the present application.
Figure 6:
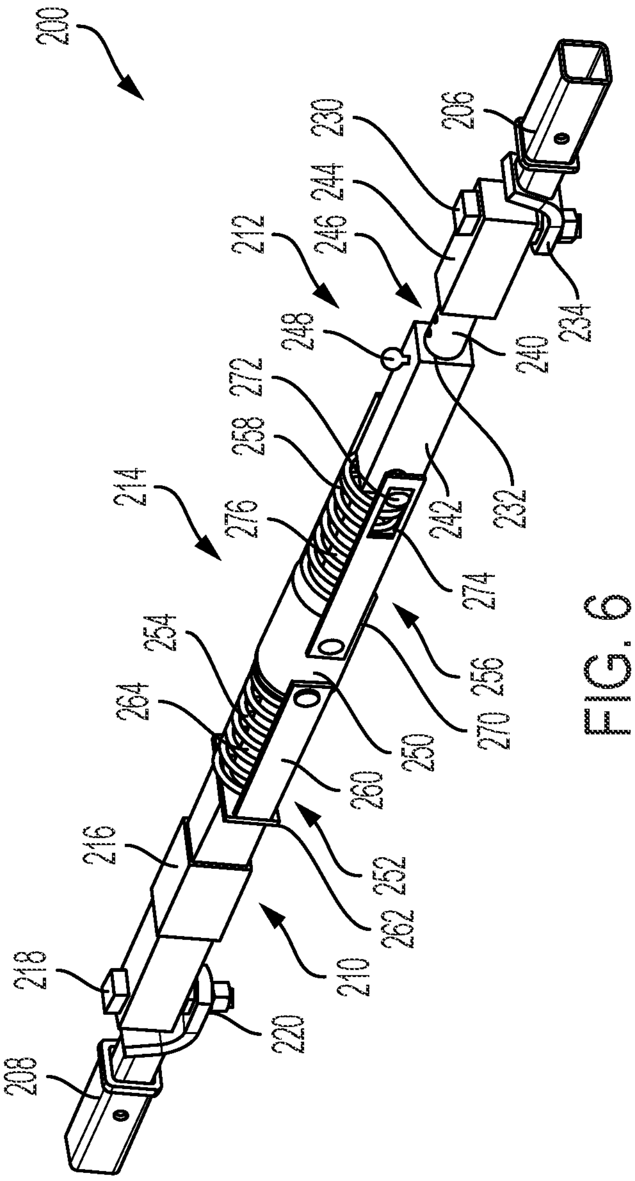
FIG. 6 is a perspective view of the example tow bar system shown in FIG. 5, in accordance with the principles of the present application.
Figure 7:
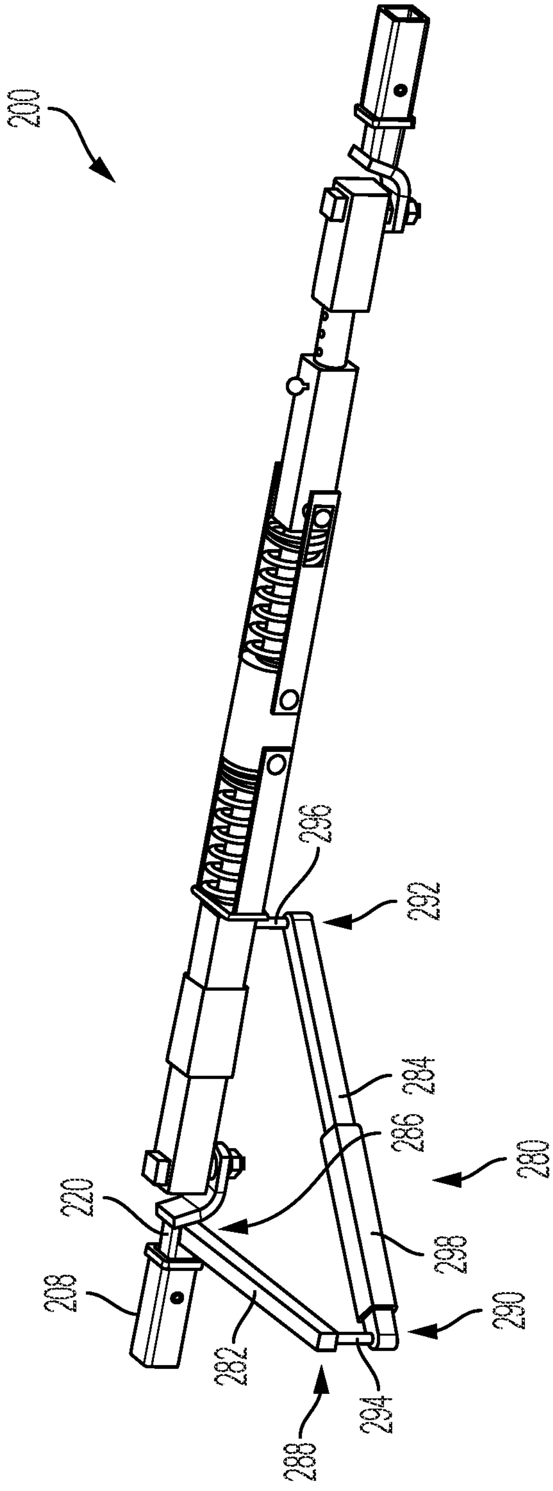
FIG. 7 is a perspective view of the example tow bar system shown in FIG. 6 with an example horizontal lockout assembly, in accordance with the principles of the present application.

With reference now to FIGS. 5-7, a tow bar system to provide a physical linkage between a lead vehicle and trailer vehicle will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, and/or (i) an optional means to lockout the lateral steering degree of freedom at one end of the tow bar. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control. The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the two bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or back-up sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

With continued reference to FIGS. 5-7, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

Figure 8:
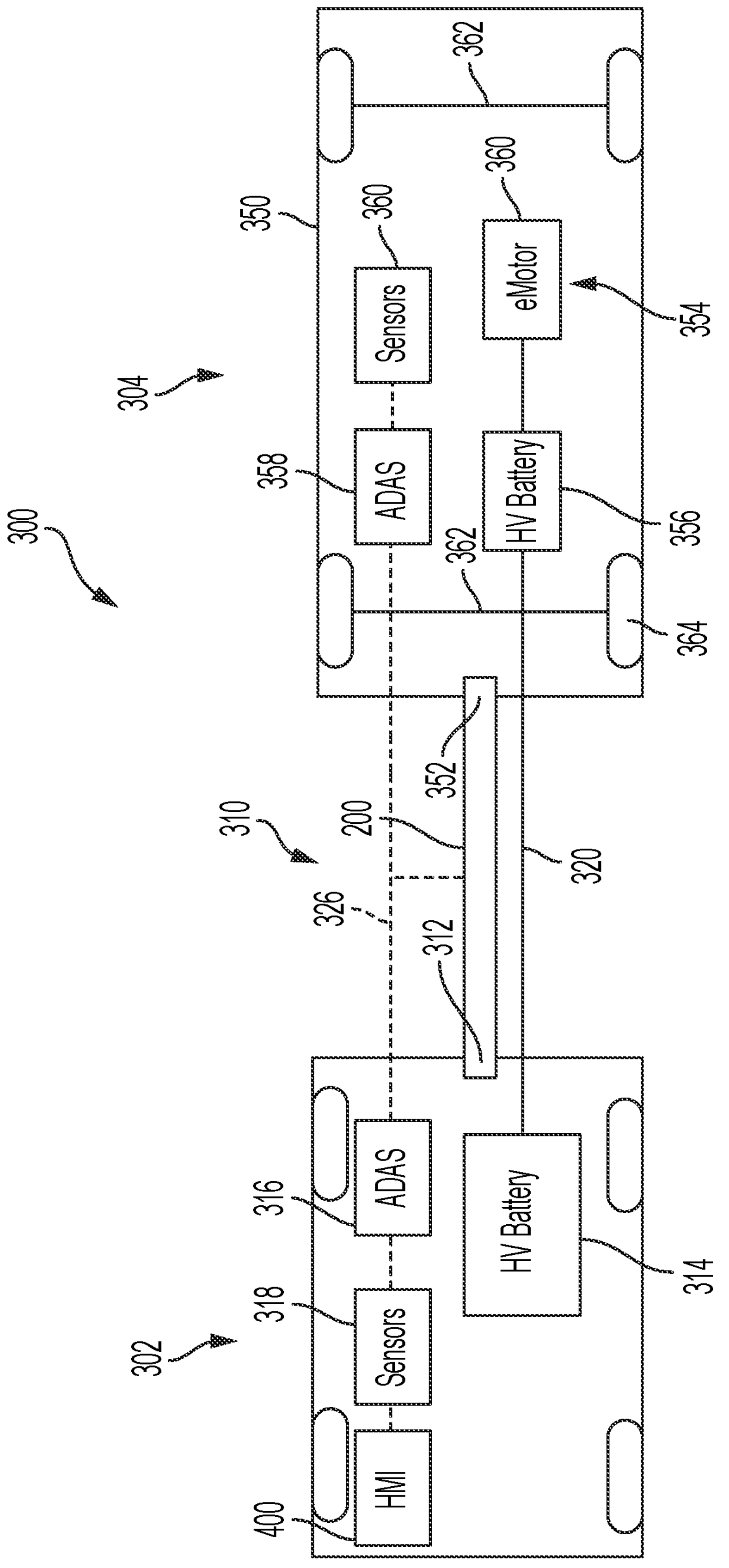
FIG. 8 is a schematic illustration of an example multi-vehicle system with a lead vehicle and self-powered trailer vehicle in accordance with the principles of the present application.

With reference now to FIG. 8, a control system for a self-propelled trailer will be described in more detail. The trailer control system is configured to make towing easier by automatically optimizing the path of the trailer to accurately follow the lead vehicle. The maneuvering capability of a self-propelled trailer with a steerable axle (e.g., trailer systems 10, 100) along with a tow bar system (e.g., tow bar system 200) enables the trailer to adjust and optimize its path of travel, as well as correct driver errors to improve safety and driveability.

In this way, the trailer control system enables the trailer to respond to its environment and change its direction of travel dynamically, for example, if obstacles (e.g., vehicles, pedestrians) appear during trailering maneuvers. Moreover, the trailer control system enables the trailer to move relative to the lead vehicle while still remaining attached thereto. To perform such operations, the trailer control system includes ADAS sensing capability through its own sensor system and/or the sensor system of a lead vehicle.

The trailer control system also enables the trailer to bias horizontally from the lead vehicle and travel in a straight line parallel to the lead vehicle, which enables better visibility and crosswind performance at highway speeds, as well as lane centering in urban environments. Directional control of the trailer can further be accomplished by sensors in the tow bar system such as, for example, angle sensors at one or both ends of the tow bar where pivoting occurs, a linear accelerometer or displacement sensor to measure relative acceleration of the lead vehicle and trailer, and force sensors to measure tension/compression loads between the lead vehicle and trailer. Additionally, CAN signals such as wheel speed, steering angle, and throttle/steering command may be shared between the lead vehicle and the trailer control system.

The trailer control system also improves maneuvering the lead vehicle and trailer in reverse by eliminating the need for the driver to make complex double reverse steering maneuvers to initiate a turn. In operation, the trailer's own steering axle(s) respond to steering control inputs of the lead vehicle and initiate the turn itself. In some operations, the lead vehicle only needs to maneuver to follow the trailer around the turn, thereby enabling improved lane keeping and decreasing the risk of collision with obstacles that may be encountered while reversing or parking. Additionally, with the tow bar system described herein, the trailer control system enables the lead vehicle to offset horizontally from the trailer while reversing, thereby improving visibility, for example when backing up toward boat launches or into tight parking spots.

With continued reference to FIG. 8, a multi-vehicle system 300 includes a lead vehicle 302 and one or more self-propelled trailer vehicles 304 that may be connected via a tether such as tow bar system 200 (shown in FIGS. 5-7). In other examples, the vehicles 302, 304 operate without a mechanical linkage therebetween. In the example embodiment, the multi-vehicle system 300 includes a multi-vehicle control system (MVCS) 310 for the primary lead vehicle 302 and one or more self-propelled and self-guided secondary vehicles 304. The MVCS 310 is in signal communication with the lead vehicle 302, the trailer vehicle(s) 304, and/or the tow bar system 200. The MVCS 310 is configured to receive various inputs such as, for example, driver control inputs, inputs from various ADAS sensors, pre-programmed preferences and settings, or inputs from other sources. Based on the received inputs, the MVCS 310 constructs output(s) to optimize performance of the multi-vehicle system 300. In this way, the MVCS 310 treats the multiple vehicles as separate, but dynamically connected bodies, and translates driver inputs into optimal full-system performance.

In the example embodiment, the MVCS 310 is a multi-vehicle dynamic ADAS/autonomous driving system with sensing and computing capability housed in the lead vehicle 302 and/or the secondary vehicle 304 and connected via a physical tether or secure wireless connection. The MVCS 310 is in signal communication with and/or integrated with a lead vehicle HMI system 400 to provide information and control to the driver of the multi-vehicle system 300, as will be described herein in more detail.

The lead vehicle 302 may be any suitable towing vehicle. However, in the illustrated example, lead vehicle 302 generally includes a trailer hitch 312, a high voltage battery system 314, an ADAS/autonomous driving system 316 operably connected to a sensor suite 318, and the HMI system 400. The trailer hitch 312 is configured to removably couple to the tow bar system 200 or directly to the trailer vehicle 304. The high voltage battery system 314 is configured to power one or more electric traction motors (not shown) of the lead vehicle 302. A high voltage connection 320 is configured to electrically couple the high voltage battery system 314 with the self-powered trailer vehicle 304, for example, to provide bi-directional charging therebetween.

Figure 9:
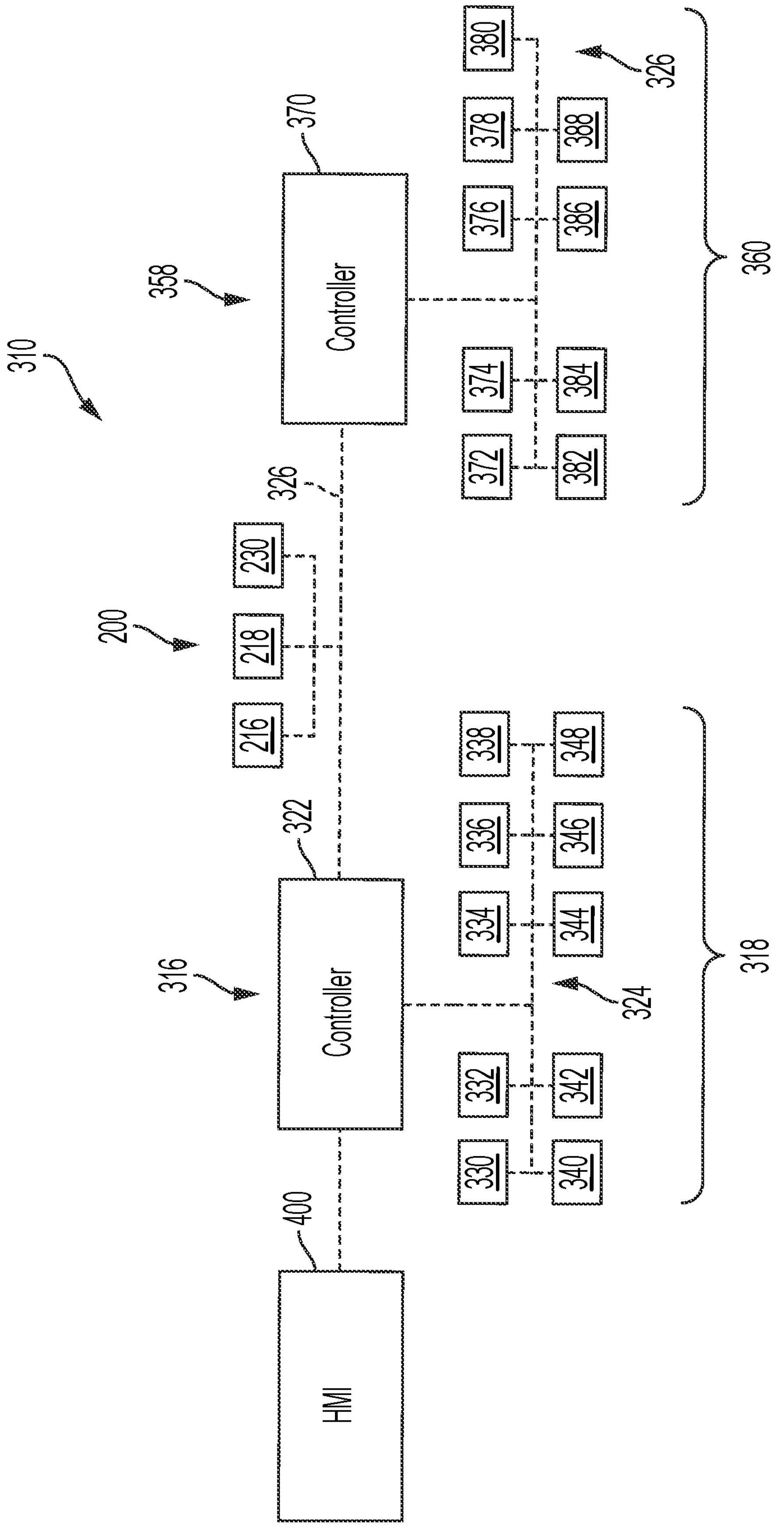
FIG. 9 is a schematic illustration of an example multi-vehicle control system (MVCS) of the multi-vehicle system of FIG. 8, in accordance with the principles of the present application.

With additional reference to FIG. 9, in the example embodiment, the ADAS/autonomous driving system 316 includes a controller 322 in signal communication with the sensor suite 318 and the HMI system 400, for example, via a CAN bus 324. The ADAS/autonomous driving system 316 is further in signal communication with the tow bar system 200 and/or trailer vehicle 304 via a wired or wireless connection 326. As shown in FIG. 6, the tow bar system 200 includes angle sensors 218, 230 configured to sense an angle between the tow bar system 200 and the lead vehicle 302 and/or trailer vehicle 304, as well as a load cell 216 configured to sense various forces on the tow bar (e.g., trailer tongue weight, tension, compression, length change, acceleration, etc.).

In the illustrated example, the sensor suite 318 generally includes a vehicle speed sensor 330, vehicle steering sensor 332, wheel speed sensors 334 (e.g., one for each wheel), accelerometer(s) 336, a throttle position sensor 338, a brake sensor 340, blind spot monitoring/cross path sensor(s) 342, ultrasonic park sensor(s) 344, one or more cameras 346 (e.g., back up, park view side, drone, etc.), and a battery charge monitoring sensor 348. However, it will be appreciated that sensor suite 318 may include any additional sensors that enable trailer vehicle 304 to function as described herein.

With continued reference to FIGS. 8 and 9, in the example embodiment, the trailer vehicle 304 is a self-propelled, BEV based trailer with at least one steerable axle such as, for example, the trailer systems 10, 100 described herein. Trailer vehicle 304 generally includes a chassis/platform 350, a hitch connection 352, a BEV powertrain 354, a high voltage battery system 356, and an ADAS/autonomous driving system 358 operably connected to a sensor suite 360. The hitch connection 352 is configured to removably couple to the tow bar system 200 or directly to the lead vehicle 302. The BEV powertrain 354 includes one or more electric traction motors 360 that generate and transfer torque to one or more steerable axles 362 and wheels 364 via intermediate components (e.g., a transmission, shafts, differential, etc.). The high voltage battery system 356 is configured to power the BEV powertrain 354 and electrically couple to the lead vehicle 302, for example, via the high voltage connection 320.

As shown in FIG. 9, in the example embodiment, the ADAS/autonomous driving system 358 includes a controller 370 in signal communication with the sensor suite 360, for example via a CAN bus 371. The ADAS/autonomous driving system 358, which integrates with or is part of MVCS 310, includes steer-by-wire, throttle-by-wire, and brake-by-wire modules (not shown) or functionality. The ADAS/autonomous driving system 358 is further in signal communication with the tow bar system 200 and/or lead vehicle 302 (e.g., ADAS/autonomous driving system 316) via the wired or wireless connection 326. In this way, MVCS 310 is configured to receive signals from the lead vehicle 302 and/or tow bar system 200 indicating system conditions such as, for example, lead vehicle steering, throttle position, wheel speed, relative angular positioning, etc.

In the illustrated example, the sensor suite 360 generally includes a trailer speed sensor 372, a trailer steering sensor 374, wheel speed sensors 376 (e.g., one for each wheel), accelerometer(s) 378, a brake sensor 380, blind spot monitoring/cross path sensor(s) 382, ultrasonic park sensor(s) 384, one or more cameras 386 (e.g., back up, park view side, drone, etc.), and a battery charge monitoring sensor 388. However, it will be appreciated that sensor suite 360 may include any suitable sensor that enables trailer vehicle 304 to function as described herein.

As previously described, the MVCS 310 is configured to automatically perform various trailering maneuvers based on one or more signals from the trailer vehicle 304, lead vehicle 302, and/or tow bar system 200. Such signals, for example, are received from the trailer ADAS/autonomous driving system 358, the lead vehicle ADAS/autonomous driving system 316, and/or tow bar system 200. Accordingly, MVCS 310 may include one or more controllers, such as controllers 322, 370, to receive the one or more signals and execute one or more algorithms to provide the desired trailering maneuver. Moreover, the MVCS 310 integrates with the lead vehicle HMI system 400 to provide trailering information and control to the operator of the multi-vehicle system 300.

With reference now to FIGS. 10-20, the HMI system 400 will be described in more detail. In the example embodiment, the HMI system 400 is a driver/user interface for a lead vehicle towing a motorized and steerable trailer that is attached to the lead vehicle by a tether. The HMI system 400 provides various layouts, organization, and priority of any trailering information provided to the lead vehicle driver during operation of the multi-vehicle system 300. The trailering information may be displayed in the lead vehicle's instrument cluster, center-stack display, heads-up-display (HUD), or any other display visible to the lead vehicle driver. Information may also be provided to the driver via visual, audio, or tactile feedback, which may be provided through one or more of the vehicle primary controls, such as steering wheel torque, brake and throttle control feedback tuning. Additionally, the HMI system 400 organizes and presents available inputs or selections for the driver via display selections, buttons, or the like.

The information displayed, allowed inputs, and feedback to the lead vehicle driver are organized into driving modes depending on driver selection and driving environment. In one example, the driving modes include (i) Urban Maneuvers, (ii) Two-lane Touring, (iii) Divided Highway, (iv) Trailer Reverse, and (v) Out of Position Recovery.

In the Urban Maneuvers mode, the HMI system 400 provides a drone (plan) view of the multi-vehicle system 300 and potential surrounding static and moving (e.g., pedestrian) objects, an overlay of ultrasonic sensor detection around the vehicles, an overlay of mid-range radar sensor detection, highlighted lane bias and other path corrective actions, and notification of possible jackknife conditions (e.g., via power steering soft stops). In the Two-lane Touring mode, the HMI system 400 provides a drone view of Lane Keep Assist with trailer lane centering/damping, a drone view or modified view (e.g., body inclusive and forward obstacle) of passing performance and clearance (e.g., mid-range radar sensors), a view of four-way stop/turn inside radius with obstacles, and roundabout navigation (e.g., left/right curbing prevention).

In the Divided Highway mode, the HMI system 400 provides manual driving, a drone view for lane bias visibility and aerodynamic optimization modes, L2+/L3 autonomous driving, and Michigan left/U-turn driving. In the Trailer Reverse mode, the HMI system 400 provides a drone view of the multi-vehicle system 300 and potential surrounding static and moving objects, an overlay of ultrasonic sensor detection around the vehicles, an overlay of mid-range radar sensor detection (e.g., cross-path), and a simultaneous large view for trailer reverse steering control (TRSC) driving. In the Out of Position Recovery mode, the HMI system 400 provides a drone view of the multi-vehicle system 300 and instructions for jackknife position recovery.

In one example, the HMI system 400 will set different warnings (visual/audio/haptic) with appropriate escalations and interventions. Information displayed and inputs allowed may be selected automatically by the vehicle controller based on the driving environment (e.g., traffic, location, weather, road surface, etc.) or driver presets. Some actions may be taken automatically to protect the vehicle(s) and may selectively prevent overriding by the lead vehicle driver.

In some implementations, HMI system information management may be determined by the driver's level of skill or comfort. The amount of information displayed to the driver may increase in quantity and complexity based on driver preference with the ability to provide only basic information to minimize distraction for novice drivers, or to let expert drivers optimize their driving experience with detailed information about their trailer setup and several configurable settings. Additionally, the HMI system 400 may suggest different configurations depending on the skill level of the driver, and the suggestions may change over time as the skill of the driver improves from a novice to a more experienced tower. Moreover, the HMI system 400 may include information related to range, fuel, energy use, and the like, as well as user selected settings for desired energy source usage, transfer, and reserve.

Accordingly, the HMI system 400 effectively manages the information and settings available for a self-propelled trailer by providing multiple driving modes for a variety of situations. These modes can be changed based on the driving environment, driver preference, and/or driver skill/experience level. The HMI system can be configured to make the towing task as easy as possible for the novice driver, or to provide a wide variety of information for the more experienced tower. Various tasks or maneuvers will cause different information to be displayed automatically and may cause the trailer to respond differently to certain inputs from the driver. For example, under highway driving conditions, it may be desirable to position the trailer vehicle 304 in the lane relative to the lead vehicle 302. The driver may choose to have the trailer offset slightly to account for crosswinds or improve visibility. However, in urban environments, the trailer vehicle 304 may automatically center itself in the lane to avoid contact with obstacles, in which case information about lateral offset may not be useful to the driver. Additionally, camera views may be manually or automatically changed as the driver shifts to reverse to makes backing/turning maneuvers.

Accordingly, the HMI system 400 is configured to display information different from traditional trailer towing displays due to the different degree of freedom for a motorized and steerable trailer vehicle 304. The self-propelled trailer vehicle 304 is configured to behave differently as the driving environment changes, and the maneuvers required in such situations will cause the information provided to change in priority.

Figure 10:
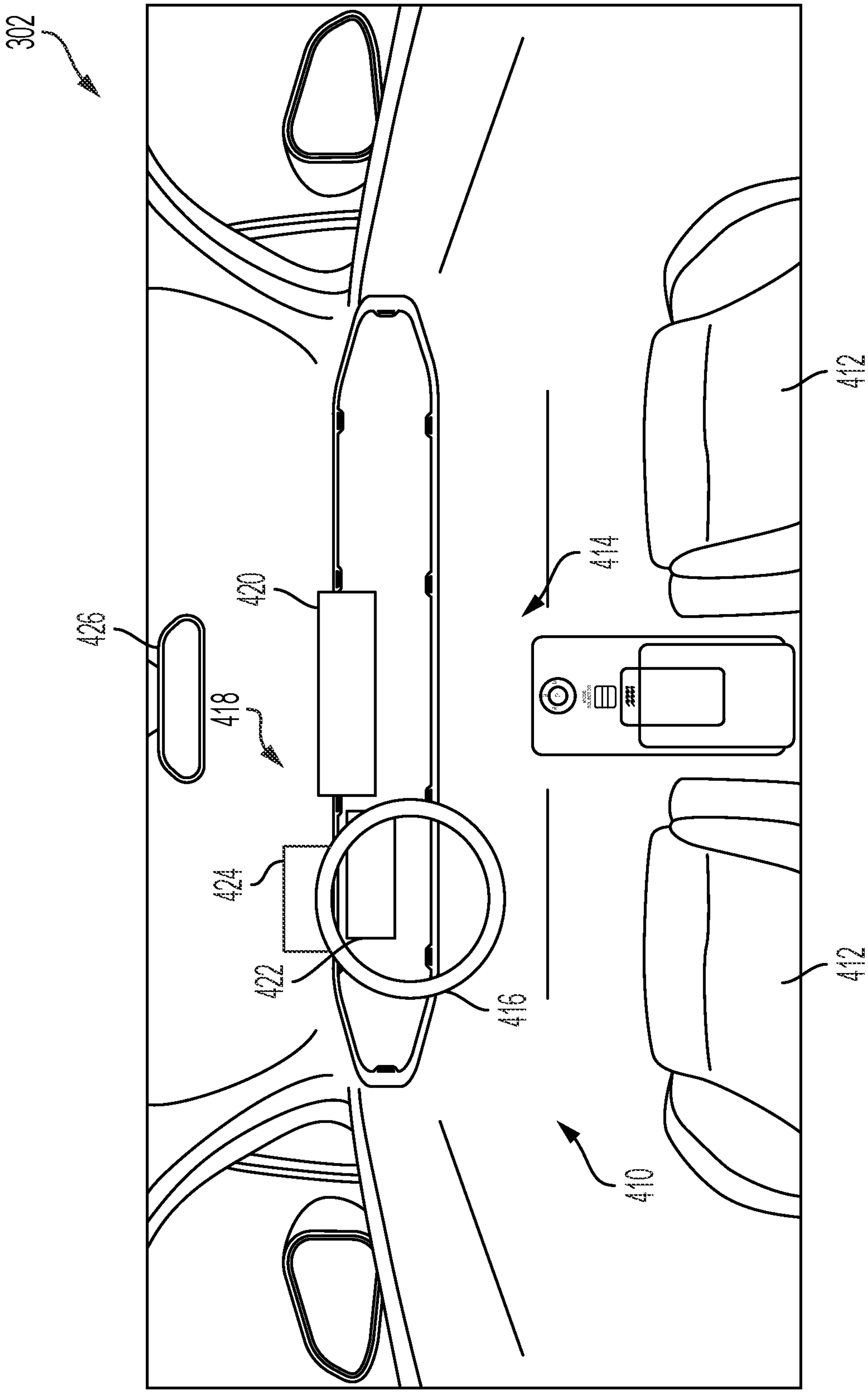
FIG. 10 is a partial view of an example lead vehicle of the MVCS including a plurality of displays of a human machine interface (HMI) system, in accordance with the principles of the present application.

With particular reference now to FIG. 10, the HMI system 400 is integrated into the lead vehicle 302, which generally includes an interior cabin 410 having a plurality of seats 412, a center stack or instrument panel 414, and a steering wheel 416. The HMI system 400 is in signal communication with one or more displays 418 including, for example, a head unit or center display 420, a cluster display 422, a Heads-Up Display (HUD) 424, and a digital rear view mirror 426. However, it will be appreciated that HMI system 400 may be in signal communication with any suitable display, button, switch, electronic device, etc. that enables HMI system 400 to function as described herein.

Figure 11:
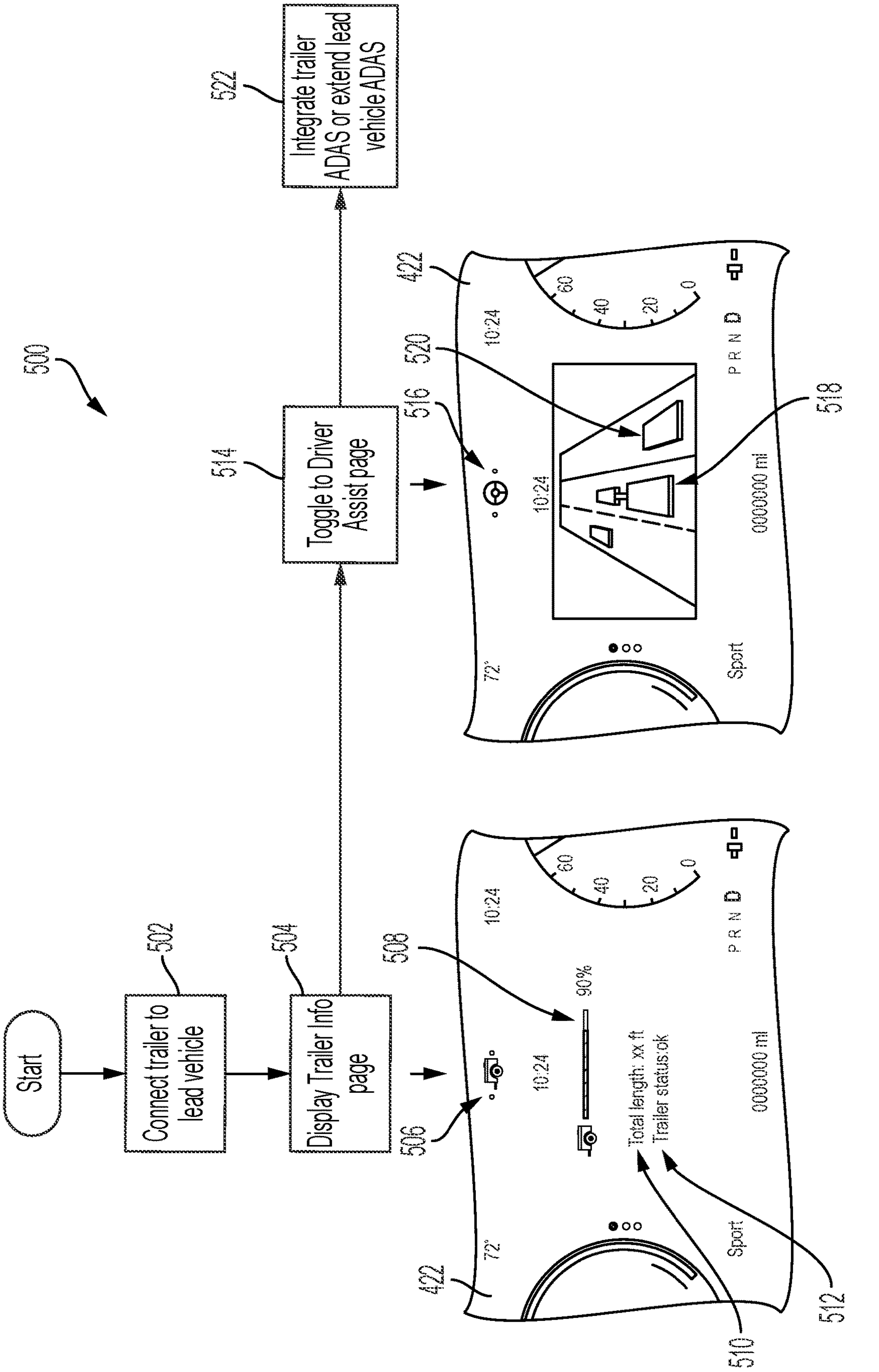
FIG. 11 is a flow diagram illustrating an example operation of the HMI system, in accordance with the principles of the present application.

Referring now to FIG. 11, an example flow diagram 500 illustrates how the HMI system 400 provides information to the lead vehicle driver to enable interaction with the MVCS 310, the lead vehicle 302, and the trailer vehicle 304. At step 502, the trailer vehicle 304 is connected to the lead vehicle 302 via a physical tether 200 and/or a wired or wireless signal connection. At step 504, with the trailer vehicle 304 connected, the HMI system 400 automatically displays an additional "trailer information" screen or page 506 on the cluster display 422, as shown. In this way, the Trailer Page 506 is added to other existing information pages (not shown, e.g., fuel economy, engine info, etc.), and the user may toggle amongst all pages in the cluster display 422.

As shown, the Trailer Page 506 provides trailering information to the driver, including a trailer battery level 508, a trailer length data 510, and a trailer status 512. In one example, the trailer status 512 is configured to identify if the trailer vehicle 304 is "OK" and operational, or if various trailer issues exist (e.g., trailer light failure, trailer wheel low pressure, etc.). At step 514, the user may toggle to a Driver Assist Page 516, which provides a dynamic representation 518 of the lead vehicle and connected trailer vehicle, as well as surrounding vehicles 520. At step 522, the MVCS 310 integrates the ADAS sensor capabilities of the trailer vehicle 304 with the lead vehicle 302, or extends the ADAS sensor capabilities of the lead vehicle 302 to the trailer vehicle 304 if not equipped with its own ADAS capability.

Figure 12:
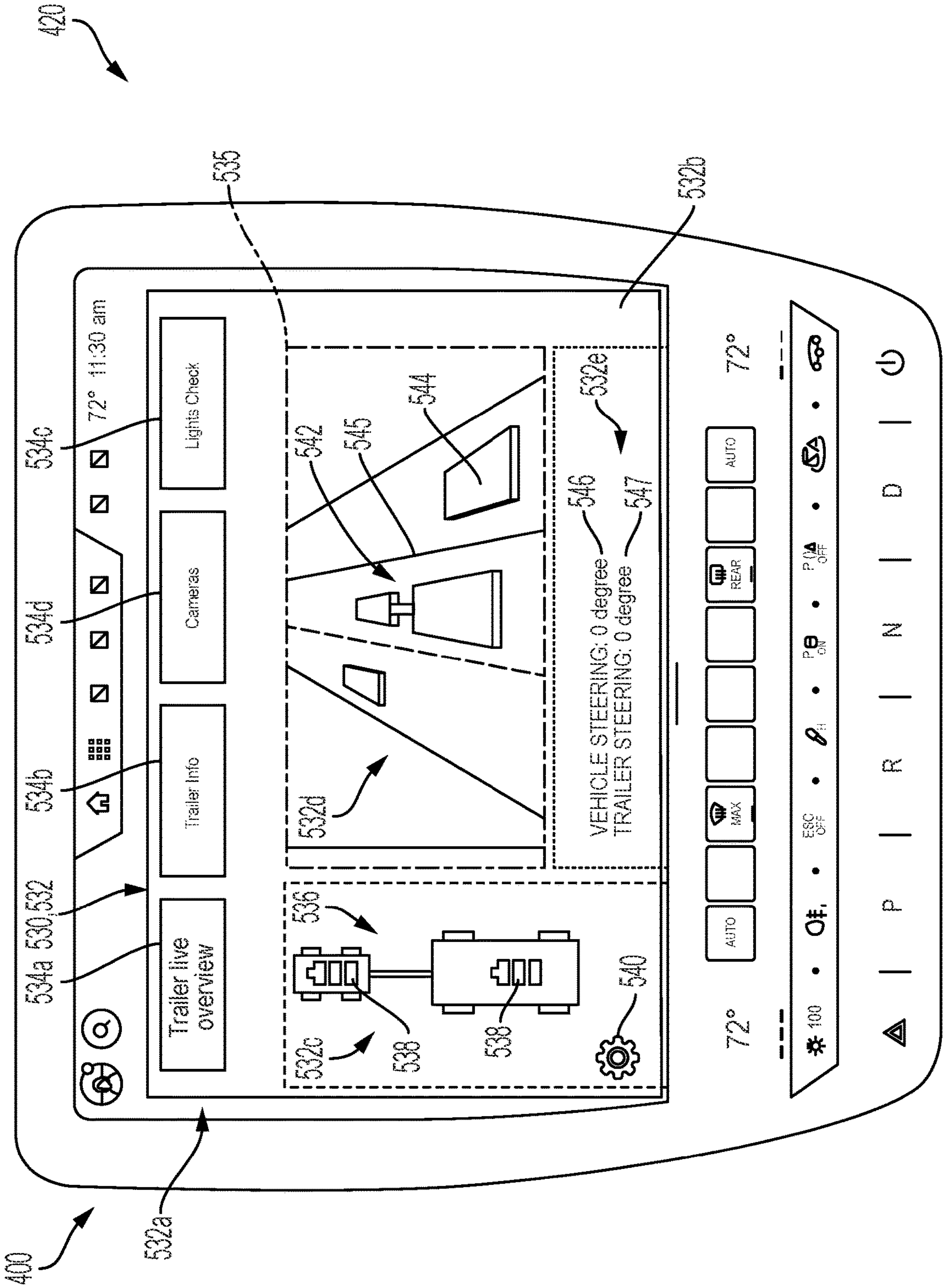
FIG. 12 is an example trailer mode screen generated by the HMI system, in accordance with the principles of the present application.

Referring now to FIG. 12, HMI system 400 displays a trailer mode user interface screen 530 on the lead vehicle center display 420 once the trailer vehicle 304 is connected to the lead vehicle 302. The trailer mode screen 530 may be reached from a previous screen/page (not shown) that includes a plurality of menu buttons, which when selected, provide information related to that particular menu button. For example, a trailer menu button (not shown) may become active once the trailer vehicle 304 is connected and, when selected, may bring the user to the trailer mode screen 530.

In the illustrated example, the trailer mode screen 530 is configured to provide a plurality of application interfaces or sections 532, which illustrate particular trailering info and/or enable a user to interact with an application associated with that section 532. As shown, the sections 532 include a sub-menu 532*a* and a sub-menu information section 532*b*. The sub-menu 532*a* provides various sub-menu navigation buttons 534 including a Trailer Live Overview button 534*a*, a Trailer Info button 534*b*, a Lights Check button 534*c*, and a Cameras button 534*d*. In other embodiments, sub-menu navigation buttons 534 include a Tow Checklist and Setup buttons (not shown). It will be appreciated that the various soft buttons and informational boxes are not limited to the illustrated orientation and may have any suitable arrangement that enables HMI system 400 to function as described herein.

Figure 16:
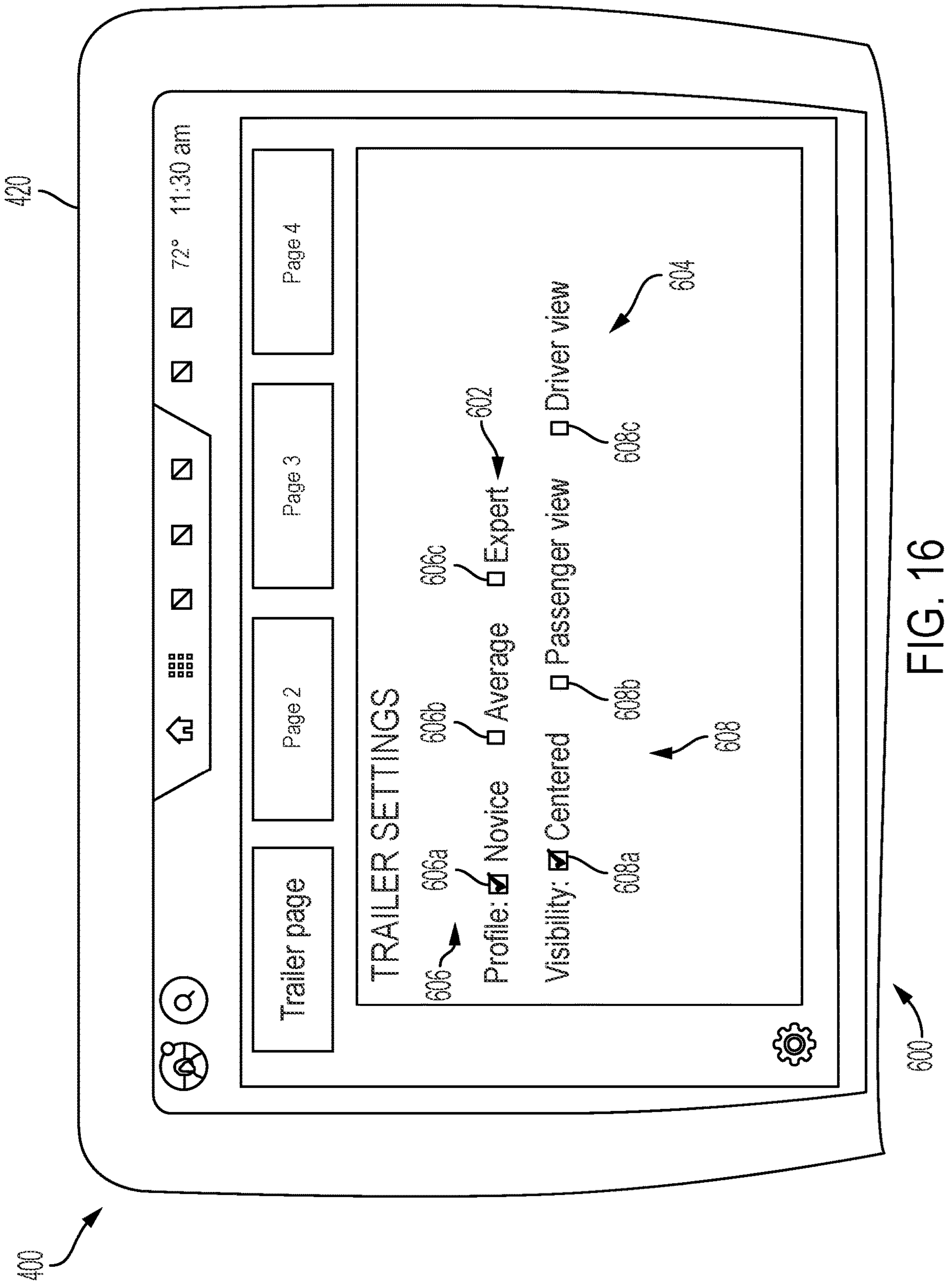
FIG. 16 illustrates an example trailer settings page generated by the HMI system, in accordance with the principles of the present application.

As shown in FIG. 12, selection of the Trailer Live Overview button 534*a* displays a trailer live overview page 535 in the sub-menu information section 532*b*. In the example embodiment, the trailer overview page 535 includes a trailer top view 532*c*, a trailer enhanced view 532*d*, and a trailer info box 532*e* below the sub-menu 532*a*. The trailer top view 532*c* provides a graphical representation 536 of the multi-vehicle system 300, including a position of the trailer vehicle 304 relative to the lead vehicle 302, and battery levels 538 for each of the lead and trailer vehicles 302, 304. The trailer top view 532*c* also provides a settings icon 540, which navigates to a trailer settings page (FIG. 16). The trailer enhanced view 532*d* provides a 3D dynamic representation 542 of the multi-vehicle system 300 with any surrounding vehicles 544 and lane markers 545. The trailer info box 532*e* provides live data about the trailer vehicle 304 such as, for example, a vehicle steering angle 546 and trailer steering angle 547, and total multi-vehicle length and trailer status (not shown).

Figure 13:
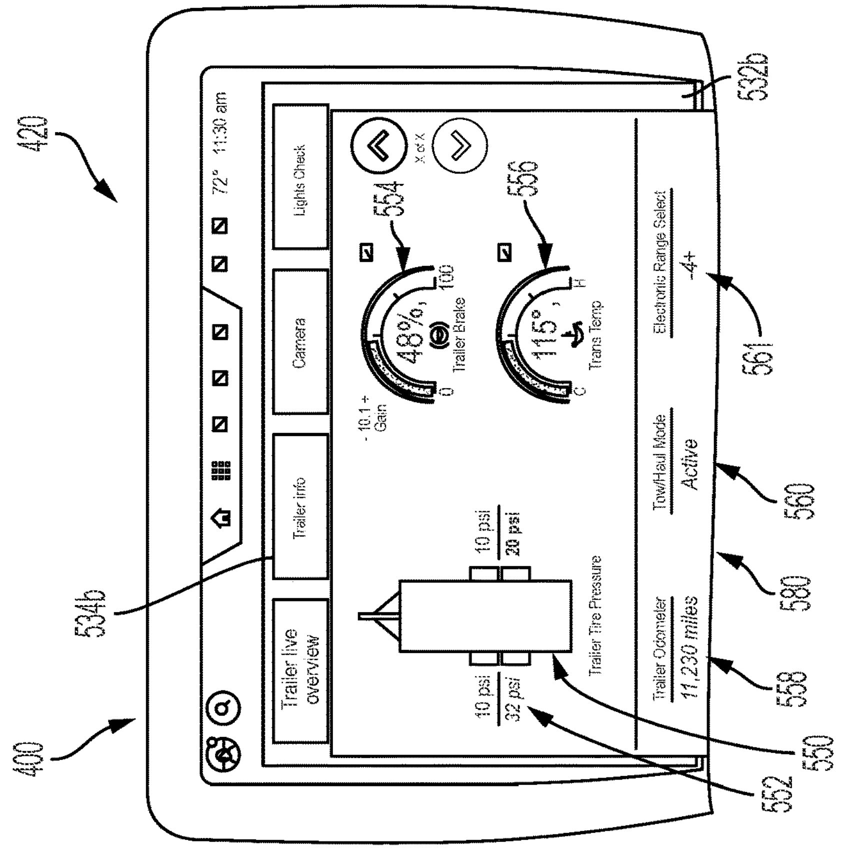
FIG. 13 is an example trailer info page generated by the HMI system, in accordance with the principles of the present application.

As shown in FIG. 13, selection of the Trailer Info button 534*b* displays a trailer info page 580 in the sub-menu information section 532*b*. In the example embodiment, the trailer info page 580 displays various information about the trailer vehicle 304 such as, for example, a graphical representation 550 of the trailer vehicle, trailer tire pressure 552, trailer brake 554, transmission oil temperature 556, trailer odometer 558, a tow/haul mode status 560, and an electronic range select 561.

Figure 14:
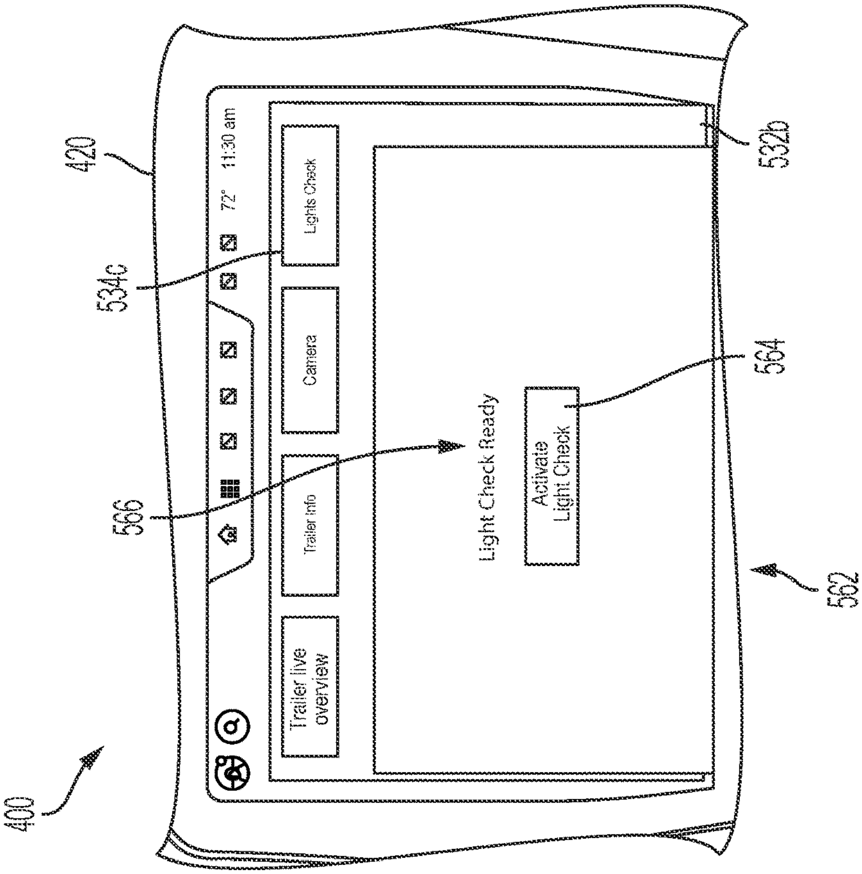
FIG. 14 is an example light check page generated by the HMI system, in accordance with the principles of the present application.

As shown in FIG. 14, selection of the Lights Check button 534*c* displays a light check page 562 in the sub-menu information section 532*b*. In the example embodiment, the light check page 562 displays a soft button 564 to activate a light check and a light check status field 566. Once the Activate Light Check button 564 is pressed, the soft button 564 will change to display "Cancel Light Check." The status field 566 will change from "Light Check Ready" to "Light Check In Progress—Exit vehicle to visually inspect lights." This command will subsequently illuminate any lights on the trailer vehicle 304 and enable the user to confirm the lights are in working order. The light check will then time out after a predetermined period of time (e.g., two minutes), and the "Cancel Light Check" display of soft button 564 will revert to display "Active Light Check" with the status field 566 once again displaying "Light Check Ready."

Figure 15B:
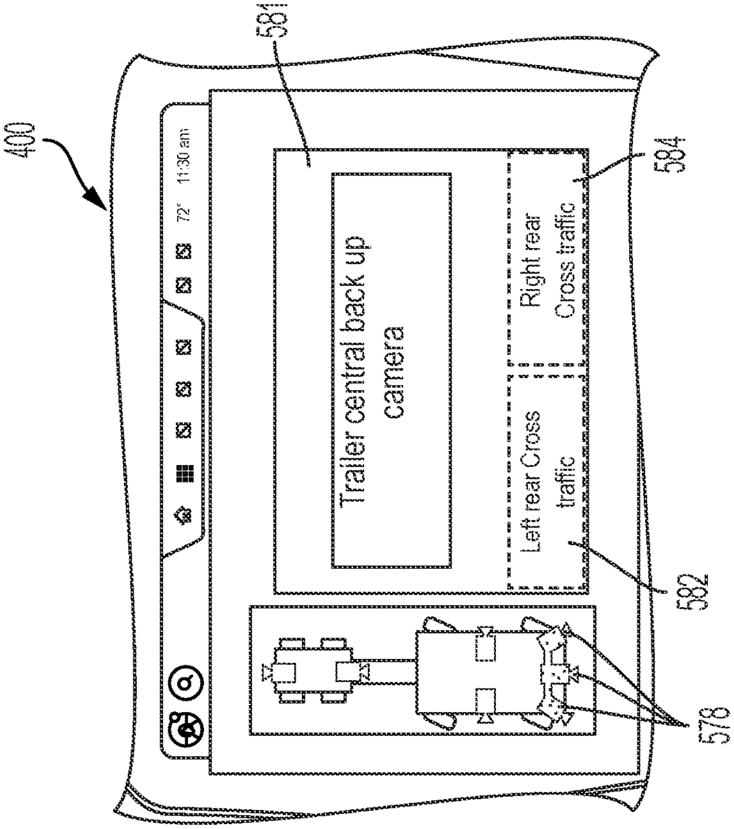
FIGS. 15A-15D illustrate example camera pages generated by the HMI system, in accordance with the principles of the present application.
Figure 15A:
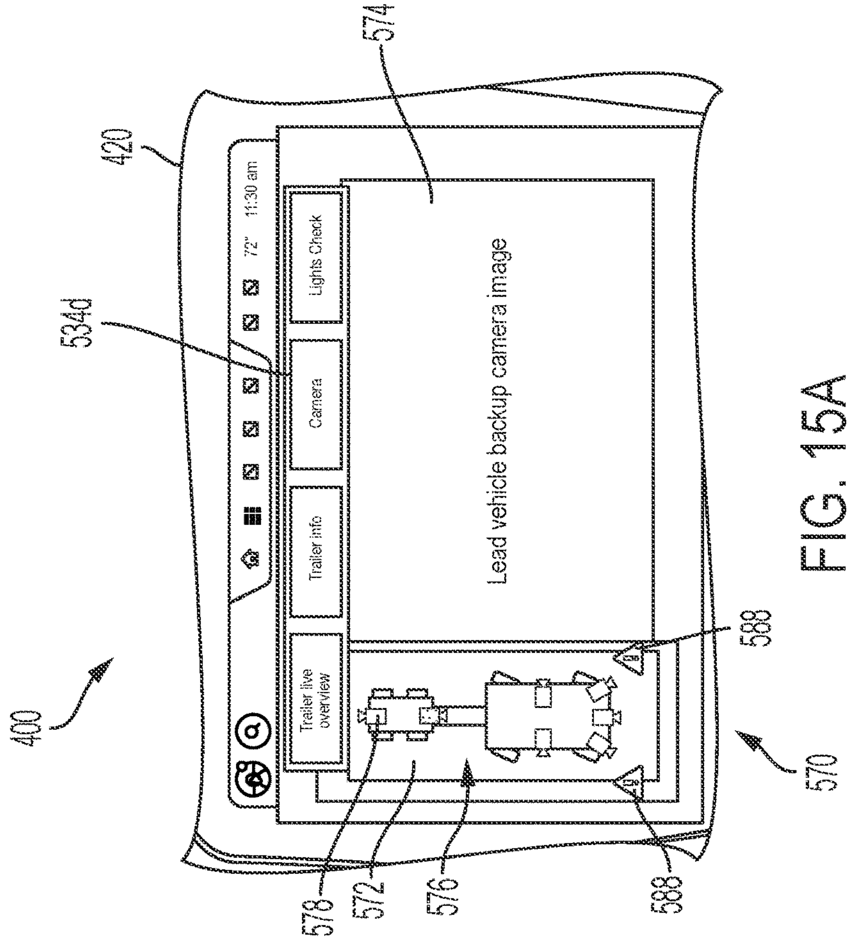

As shown in FIG. 15A, selection of the Cameras button 534*d* displays a camera page 570 in the sub-menu information section 532*b*. In the example embodiment, the camera page 570 displays a trailer top view 572 (e.g., similar to 532*c*) and a camera view 574. The trailer top view 572 provides a graphical representation 576 of the multi-vehicle system 300 including a number of camera icons 578 connected to the HMI system 400 and their general position and orientation on the multi-vehicle system 300. A user can select different camera views by selecting one of the camera icons 578 on the trailer top view 572. Once selected, the view for that particular camera icon 578 is subsequently displayed on the camera view 574.

In the example of FIG. 15A, when the lead vehicle rear camera icon 578 is selected, a view of the lead vehicle backup camera is displayed on the camera view 574. In another example shown in FIG. 15B, when the trailer vehicle rear camera icons 578 (three shown) are selected, the trailer backup camera and left/right cross traffic visualizations are linked together, with the trailer camera view 574 displaying a split screen of a trailer central backup camera view 581, a left rear cross traffic view 582, and a right rear cross traffic view 584. In another example shown in FIG. 15C, the HMI system 400 may utilize the various camera views to generate a 3D reconstruction 586 of the multi-vehicle system 300 on the camera view 574. The user is able to turn the 3D reconstruction by touching the display to view any obstacles around the multi-vehicle system 300.

Additionally, as shown in FIG. 15A, HMI system 400 is configured to display warning icons 588 on the trailer top view 572 when left/right cross-path sensors detect an object. For example, when an incoming parallel traffic is detected, a warning icon 588 is displayed on the trailer top view 572 in the corresponding incoming direction. MVCS 310 and/or HMI system 400 may also issue an acoustic warning as well as illuminate one or more warning lights on external side view mirrors.

Figure 15D:
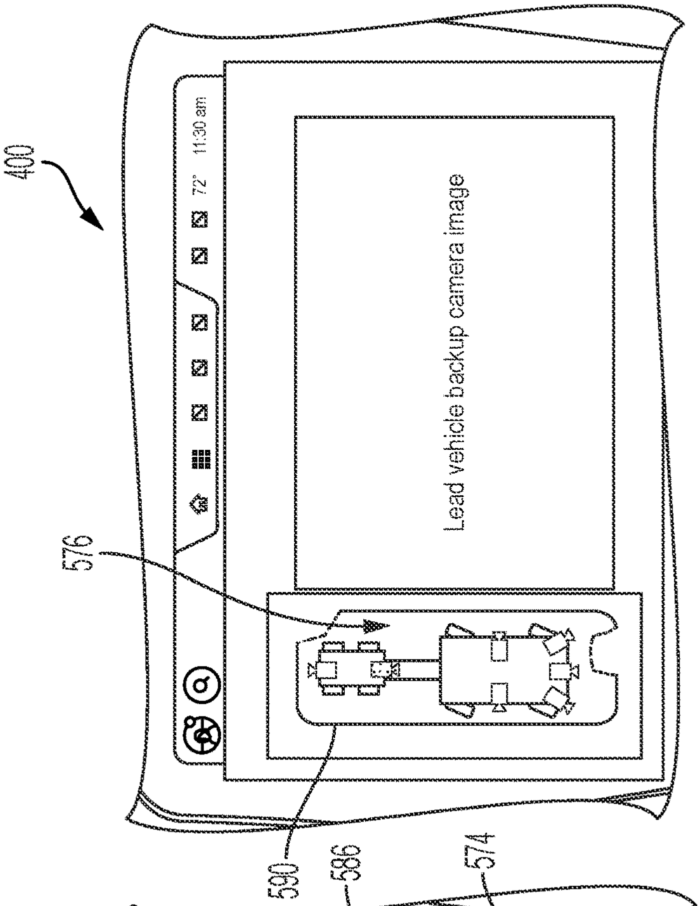
Figure 15C:
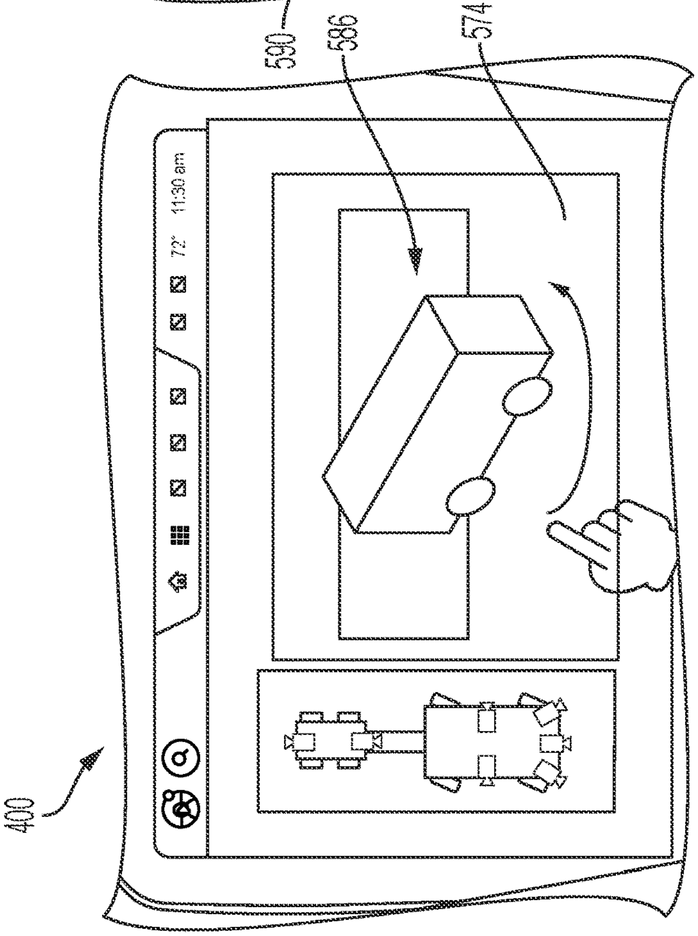

Additionally, as shown in FIG. 15D, the HMI system 400 is also configured to generate an obstacle detection perimeter 590 around the graphical vehicles 576. The area around the multi-vehicle system 300 moves dynamically according to the presence of detected obstacles. Obstacles outside of the perimeter 590 are not displayed. When an obstacle is detected, the perimeter 590 changes shape and color moving towards the lead/trailer vehicle. In one example, the perimeter 590 may have a green color indicating no obstacle detected; a yellow color indicating a detected obstacle that is still in a safe zone; and a red color indicating a detected obstacle that is within a critical zone that could result in a collision.

With reference now to FIG. 16, HMI system 400 is configured to receive input indicating a driver skill level to enable MVCS 310 to provide varying control of the multi-vehicle system 300 based on that skill level. As shown in FIG. 16, selection of the settings icon 540 (FIG. 12) displays a trailer settings page 600 with a Driver Profile 602 and a Visibility Profile 604. The Driver Profile 602 provides checkboxes 606 to select a driver trailering skill level. In the example embodiment, trailering skill levels include Novice 606*a*, Intermediate 606*b*, and Expert 606*c*. It will be appreciated that additional skill levels may be included. Selection of a checkbox 606 is configured to adjust operations/maneuvers of the MVCS 310 and thus the multi-vehicle system 300, as described herein in more detail.

In one example, with the selection of Novice 606*a*, the MVCS 310 performs vehicle maneuvers automatically to assist the novice driver to drive safely and efficiently. In this profile, the user is informed about automatic maneuvers, acknowledgement of the maneuvers is not required, and a rejection of the maneuvers is available (e.g., via soft button). With the selection of Intermediate 606*b*, the MVCS 310 is configured to automatically perform vehicle maneuvers. However, in this profile, the user is informed about an impending vehicle maneuver, and acknowledgement (e.g., via soft button) is required to begin the maneuver. This enables the user to choose how autonomously the trailer vehicle 304 operates in order to gain non-assisted experience if desired. With selection of Expert 606*c*, HMI system 400 provides less prompting and less correction during vehicle operation. In this profile, the trailer vehicle 304 behaves like a traditional trailer, and the user will be provided only with some graphical cues when deciding how to operate the multi-vehicle system 300.

Additionally, the trailer settings page 600 displays a Visibility Profile 604 providing checkboxes 608 to select a visibility level of the multi-vehicle system 300. In the example embodiment, the Visibility Profile checkboxes include Centered 608*a*, Passenger View 608*b*, and Driver View 608*c*. Selection of a Visibility Profile controls a horizontal lane bias (position) of the trailer vehicle 304. In this way, with selection of the Centered position 608*a*, the MVCS 310 moves the trailer vehicle 304 to a central position behind the lead vehicle. With selection of the Passenger View position 608*b*, the MVCS 310 moves the trailer vehicle 304 toward a driver side of the lead vehicle 302 such that the driver is able to see rearward through passenger side mirror without the trailer vehicle 304 obstructing the view. With selection of the Driver View position 608*c*, the MVCS 310 moves the trailer vehicle 304 toward a passenger side of the lead vehicle 302 such that the driver is able to see rearward through the driver side mirror without the trailer vehicle 304 obstructing the view.

With reference now to FIGS. 17-20, the HMI system 400 is configured to provide specific visualizations during various trailering scenarios to improve user experience. In the example embodiment, the trailering scenarios include (i) a Lane Bias Condition, (ii) a Planned Maneuver Assistance—Delayed Turn, (iii) a Reversing Maneuver, and (iv) a Jackknife Condition.

Figure 17:
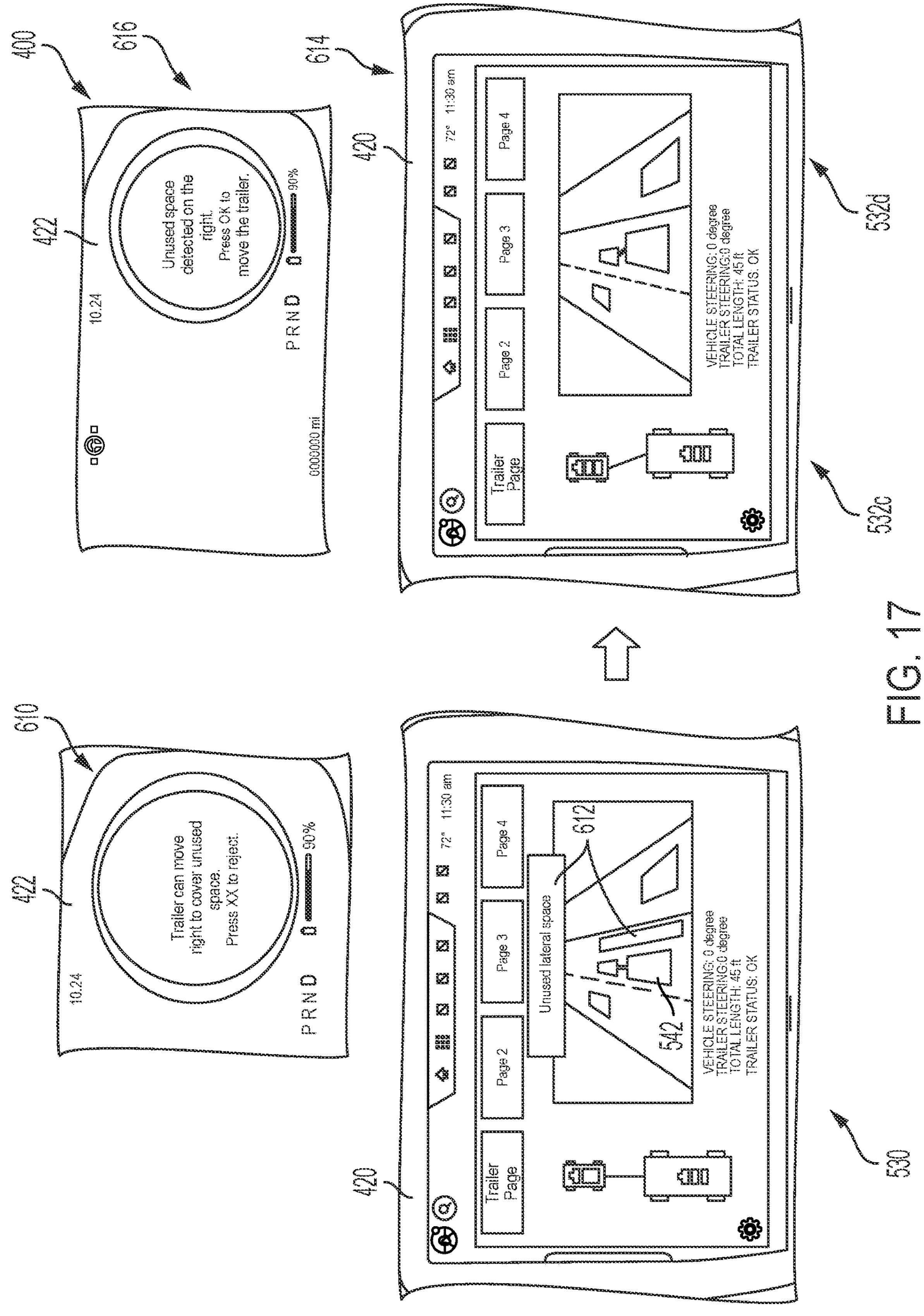
FIG. 17 illustrates example screens generated by the HMI system during a lane bias condition scenario, in accordance with the principles of the present application.

FIG. 17 illustrates the HMI system 400 operating in the Lane Bias Condition scenario. While trailering, drivers often bias to one side of their lane, thereby leaving unused lateral space within the lane. In this scenario, the HMI system 400 automatically suggests to the driver to utilize the unused lane space, and the subsequent HMI logic depends on the Driver Profile 602 selected (e.g., Novice, Intermediate, Expert).

With the Novice profile 606*a* selected, the HMI system 400 provides a message 610 on one or more of the displays 418, such as the cluster display 422 or the HUD 424, informing the driver about the automatic Lane Bias maneuver the MVCS 310 is performing. No acknowledgement (e.g., approval) is required, but the driver can reject (e.g., decline) the maneuver, for example via a button on the steering wheel (not shown). At the same time, a dedicated graphic 612 is displayed in the dynamic 3D representation 542 on the trailer mode screen 530. In the example embodiment, the graphic 612 highlights the unused lateral space and provides an indication thereof. The message 610 may also be displayed on the trailer mode screen 530. Once the maneuver is executed, the trailer top view 532*c* and trailer enhanced view 532*d* illustrate the offset trailer relative to the lead vehicle, as shown at 614.

With the Intermediate profile 606*b* selected, the HMI system 400 provides a message 616 on one or more of the displays 418, such as the cluster display 422 or the HUD 424, informing the driver about the automatic Lane Bias maneuver the MVCS 310 is able to perform. Acknowledgement is required for the MVCS 310 to perform the maneuver. At the same time, the dedicated graphic 612 is displayed in the dynamic 3D representation 542 on the trailer mode screen 530. The message 616 may also be displayed on the trailer mode screen 530. Once the maneuver is executed, the trailer top view 532*c* and trailer enhanced view 532*d* illustrate the offset trailer relative to the lead vehicle, as shown at 614.

With the Expert profile 606*c* selected, the HMI system 400 only provides the dedicated graphic 612 on the trailer mode screen 530 showing the unused lateral space.

Figure 18:
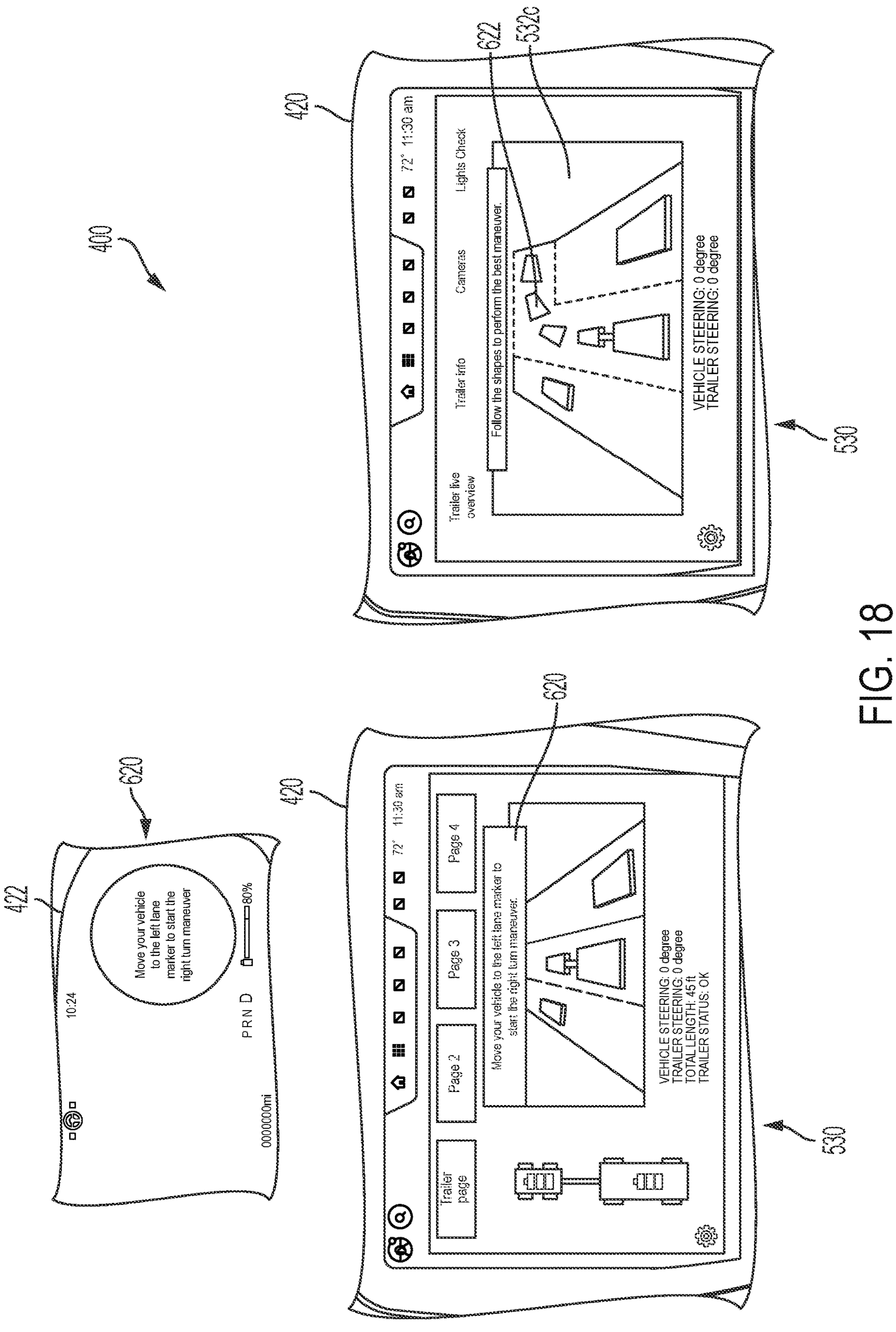
FIG. 18 illustrates example screens generated by the HMI system during a delayed turn scenario, in accordance with the principles of the present application.

FIG. 18 illustrates the HMI system 400 operating in the Planned Maneuver Assistance—Delayed Turn scenario. Based on navigation information, the HMI system 400 predicts when the driver will turn and automatically suggests turning early to avoid "delayed turning" misbehavior. In a delayed turn, the trailer vehicle 304 maintains a straight direction as the lead vehicle 302 is turning until a predetermined point, at which the trailer begins to turn. This facilitates maintaining a longer trailer away from a center point of the turn to avoid contact with, for example, a curb or other object. In this scenario, the HMI system 400 automatically suggests to the driver to turn, accelerate, and/or brake to utilize the semi-automatic trailer capabilities.

With the Novice profile 606*a* or Intermediate profile 606*b* selected, the HMI system 400 provides a message 620 on one or more of the displays 418, such as the cluster display 422 or the HUD 424, informing the driver about the upcoming delayed turning scenario. In the example embodiment, the message 620 informs the driver to move the lead vehicle 302 to a particular left/right lane marker to begin the turning maneuver in the direction opposite that particular lane marker. At the same time, the message 620 may be displayed on the trailer mode screen 530 on the center display 420. With the Expert profile 606*c* selected, the HMI system 400 only provides message 620 on the trailer mode screen 530.

In the delayed turning scenario, the HMI system 400 is configured to display a "ghost" vehicle 622 in the trailer enhanced view 532*d* and optionally on the cluster display 422. The ghost vehicle 622 represents an ideal path for the lead vehicle 302 during the turning maneuver to avoid obstacles and prevent damage to the multi-vehicle system 300. In this way, the driver is provided a visual representation of the ideal path to follow. The ghost vehicle 622 is displayed only with the Novice profile 606*a* or Intermediate profile 606*b* selected.

Figure 19:
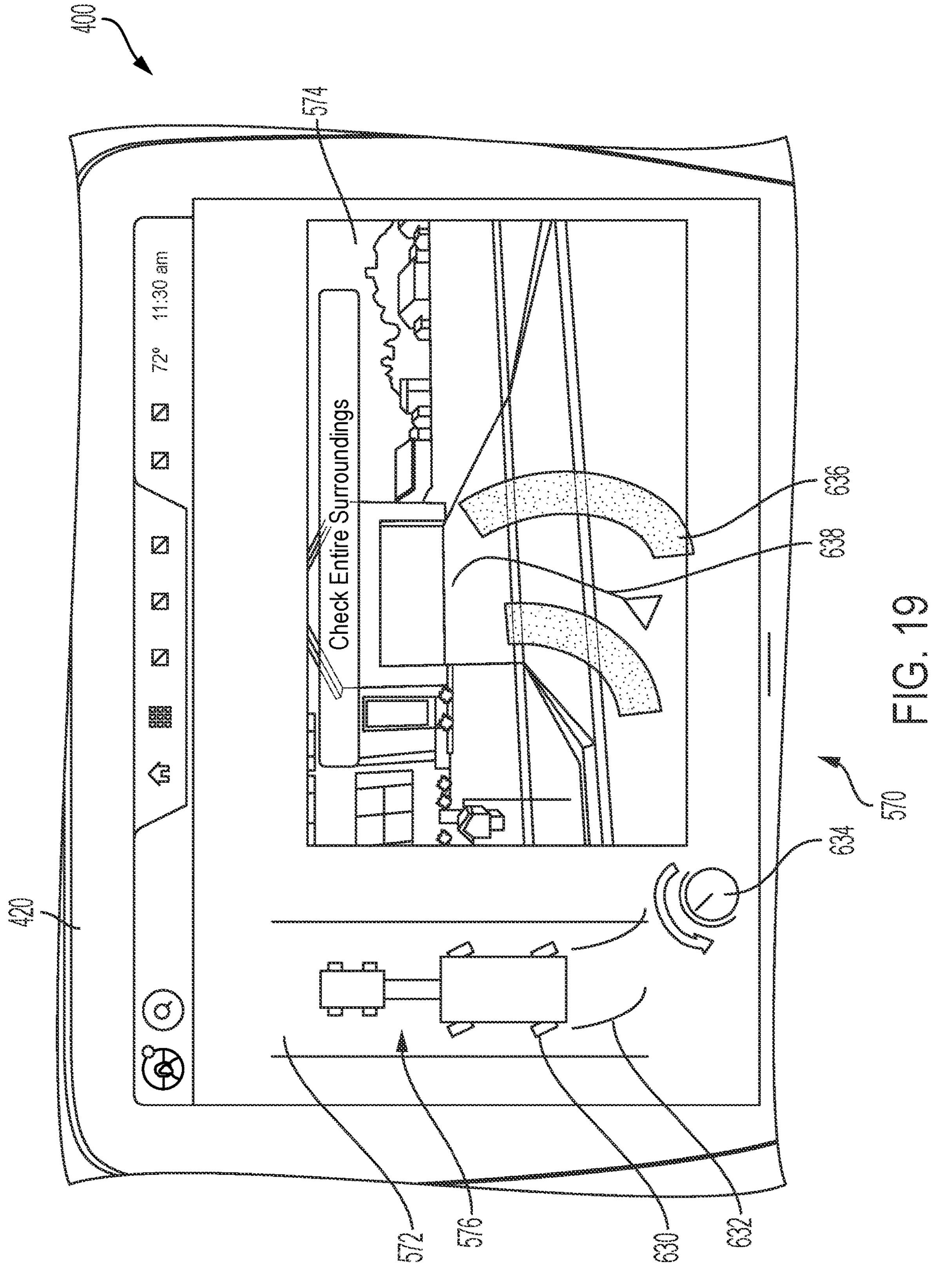
FIG. 19 illustrates an example screen generated by the HMI system during a reversing maneuver scenario, in accordance with the principles of the present application.

FIG. 19 illustrates the HMI system 400 operating in the Reversing Maneuver scenario. When the lead vehicle reverse gear is engaged, the HMI system 400 automatically displays the camera page 570 on the center display 420. The trailer top view 572 provides visual information about the trailer position through the graphical representation 576 of the multi-vehicle system 300. The graphical representation 576 includes highlighted trailer wheels 630 showing an orientation thereof, as well as steering lines 632 showing a path of the trailer vehicle 304 based on the orientation of the trailer wheels 630. With the Novice profile 606*a* selected, the HMI system 400 additionally provides a graphic 634 indicating a direction to turn the steering wheel 416 or a trailer steering knob (not shown) to follow the steering lines 632. If equipped, the trailer steering knob may be disposed in the vehicle cabin 410 and in signal communication with the MVCS 310 to control a steering direction of the lead vehicle 302 and/or the trailer vehicle 304.

In the Reversing Maneuver scenario, the HMI system 400 also displays the trailer backup camera in the camera view 574 of the camera page 570. Steering lines 636 are overlayed on the camera view 574 showing a path of the trailer vehicle 304 based on the orientation of the trailer wheels. In the example embodiment, the steering lines 636 show both front and rear wheel trajectories to provide a clear visualization of the overall space occupied by the trailer vehicle 304 during the reversing maneuver. The HMI system 400 also overlays an ideal trajectory line 638 to provide a visual path for the driver to follow using the steering wheel 416 or steering knob.

Figure 20:
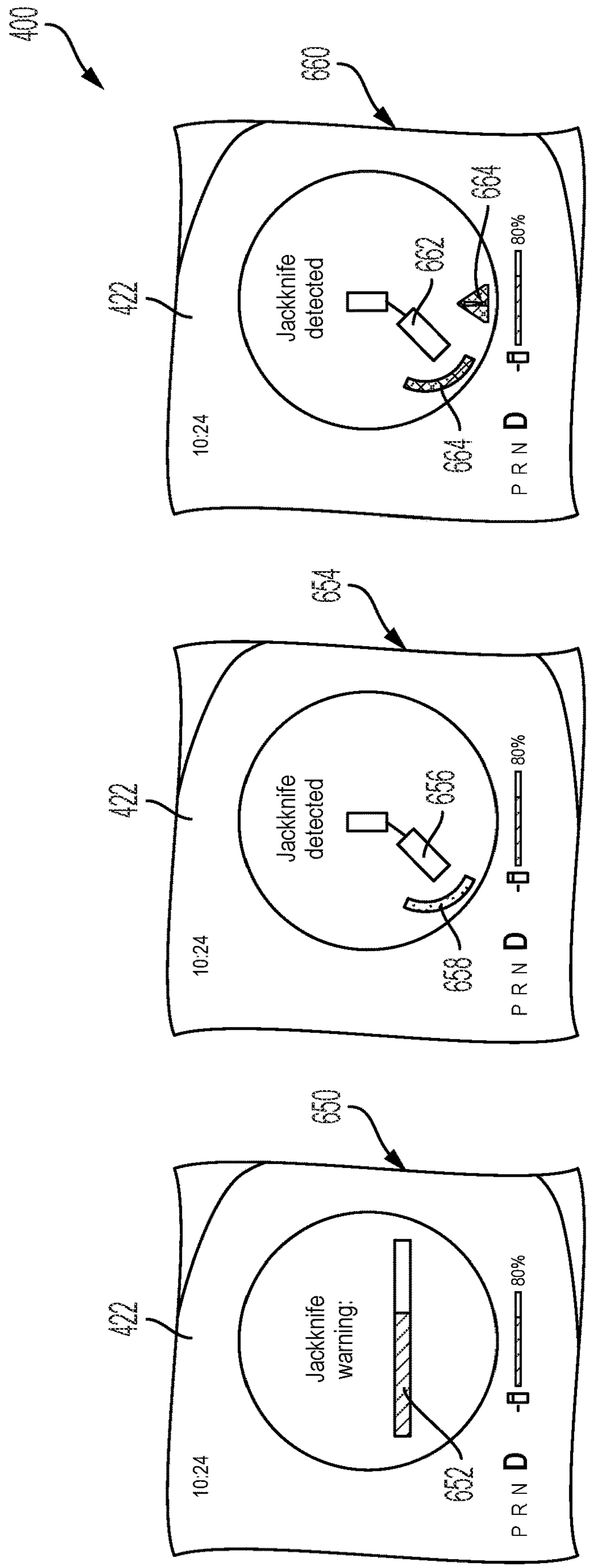
FIG. 20 illustrates an example screen generated by the HMI system during a jackknife condition scenario, in accordance with the principles of the present application

FIG. 20 illustrates the HMI system 400 operating in the Jackknife Condition scenario. In this scenario, the HMI system 400 issues a dedicated warning to alert the driver of a jackknife condition of the multi-vehicle system 300. A jackknife state is allowed for a short distance of travel to allow the driver to perform a specific maneuver. After this distance, the warning is given to the driver. In the example embodiment, the warning is issued via a haptic resistance in the steering wheel 416. The resistance can be overridden by the driver if there is a need to avoid an obstacle or make a tight turn.

With the Novice profile 606*a* or Intermediate profile 606*b* selected, once a jackknife condition is detected, HMI system 400 displays a message 650 on one or more of the displays 418, such as the cluster display 422 or the HUD 424, informing the driver about a potential jackknife condition. In the example embodiment, the message 650 presents text about the jackknife warning as well as a timeout bar 652 showing an allowed elapsed time or distance the multi-vehicle system 300 can travel before the jackknife condition is elevated. If the driver exits the jackknife condition, the message 650 is removed. If the condition is detected again, the timeout bar 652 is displayed again, completely full. The message 650 is not shown when the Expert profile 606*c* is selected.

Once the allowed time/distance of the timeout bar 652 expires, HMI system 400 displays a message 654 indicating that a jackknife is detected and a graphical representation 656 of the multi-vehicle system with a position of the trailer relative to the lead vehicle, as well as a colored warning symbol 658 (e.g., a yellow color). At the same time, the message 654 may be overlayed on the camera view 574 of the camera page 570. At this first warning stage, the jackknife is occurring and the driver is required to move forward to exit the jackknife condition. This may be determined by a predetermined range of angles detected between the lead vehicle 302 and the trailer vehicle 304.

If the HMI system 400 detects a further movement into a second predetermined range of angles indicating a further jackknife condition, the HMI system 400 displays a message 660 indicating that a critical jackknife is detected and a graphical representation 662 of the multi-vehicle system with a position of the trailer relative to the lead vehicle, as well as a colored warning symbol 664 (e.g., a red color). At the same time, the message 660 may be overlayed on the camera view 574 of the camera page 570. At this second warning stage, a critical jackknife condition is occurring and the lead vehicle 302 and/or trailer vehicle 304 may be damaged. The driver is required to move forward to exit the jackknife condition.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A human machine interface (HMI) system for a multi-vehicle system having a lead vehicle and a trailer vehicle with independent propulsion and control, the HMI system comprising:

a display disposed in the lead vehicle;

a lead vehicle sensor suite;

a trailer vehicle sensor suite; and a controller in signal communication with the display, the lead vehicle sensor suite, and the trailer vehicle sensor suite, the controller configured to:

generate a trailer mode screen on the display when the trailer vehicle is connected to the lead vehicle, wherein the trailer mode screen includes (i) a trailer top view section providing a top-view graphical representation of the multi-vehicle system, and (ii) a trailer enhanced view section providing a 3D dynamic representation of the multi-vehicle system.

2. The HMI system of claim 1, wherein the top-view graphical representation and the 3D dynamic representation show a representation of a position of the trailer vehicle relative to the lead vehicle.

3. The HMI system of claim 1, wherein the top-view graphical representation includes a battery level of the lead vehicle based on signals from the lead vehicle sensor suite, and a battery level of the trailer vehicle based on signals from the trailer vehicle sensor suite.

4. The HMI system of claim 1, wherein the trailer enhanced view section shows a representation of surrounding vehicles and lane markers.

5. The HMI system of claim 1, wherein the trailer mode screen further includes (iii) a trailer information section showing a lead vehicle steering angle based on signals from the lead vehicle sensor suite, and a trailer steering angle based on signals from the trailer vehicle sensor suite.

6. The HMI system of claim 1, wherein the trailer mode screen further includes a settings icon, whereupon selected of the settings icon, the controller is configured to generate a trailer settings page, wherein the trailer settings page provides a driver profile section to select a driver trailering skill.

7. The HMI system of claim 6, wherein the driver profile section provides options to select a novice profile, an intermediate profile, and an expert profile, wherein the controller is configured to provide various levels of information to the display based on the driver profile selection.

8. The HMI system of claim 1, wherein the trailer mode screen includes a sub-menu section providing sub-menu navigation buttons.

9. The HMI system of claim 8, wherein the sub-menu navigation buttons include:

a trailer live overview button;

a trailer info button;

a lights check button; and a cameras button.

10. The HMI system of claim 9, wherein upon selection of the trailer live overview button, the controller is configured to generate a trailer live overview page providing the trailer top view section, the trailer enhanced view section, and a trailer information section showing a lead vehicle steering angle and a trailer steering angle.

11. The HMI system of claim 9, wherein upon selection of the trailer info button, the controller is configured to generate a trailer info page providing:

a graphical representation of the trailer vehicle;

a trailer tire pressure;

a trailer brake;

a trailer transmission oil temperature;

a trailer odometer;

a trailer tow/haul status; and an electronic range select.

12. The HMI system of claim 9, wherein upon selection of the lights check button, the controller is configured to generate a light check page that displays a soft button to activate a trailer light check, and a light check status field.

13. The HMI system of claim 9, wherein upon selection of the cameras button, the controller is configured to generate a camera page providing:

a trailer top view section with a graphical representation of the multi-vehicle system, and a plurality of camera icons corresponding to locations and orientations of cameras of the lead vehicle sensor suite and the trailer vehicle sensor suite; and a camera view section configured to display a view of one or more of the cameras when one or more of the corresponding camera icons is selected.

14. The HMI system of claim 13, wherein the trailer top view section is configured to display one or more warning icons when an object is detected by an ADAS system of the trailer vehicle sensor suite.

15. The HMI system of claim 13, wherein the trailer top view section is configured to display an obstacle detection perimeter around the graphical representation of the multi-vehicle system, based on signals from an ADAS system of the lead vehicle sensor suite, and an ADAS system of the trailer vehicle sensor suite, and wherein the obstacle detection perimeter moves dynamically according to the present of detected obstacles.

16. The HMI system of claim 1, wherein the controller is configured to operate in a lane bias condition scenario, comprising:

detecting, with the trailer vehicle sensor suite, unused later space within a lane of travel of the trailer vehicle;

generating, on the display, a message indicating a lane bias maneuver may be performed; and executing, by the controller, the lane bias maneuver to steer the trailer vehicle relative to the lead vehicle to utilize the unused lateral space.

17. The HMI system of claim 1, wherein the controller is configured to operate in a delayed turn scenario, comprising:

detecting, by a navigation system of the lead vehicle, the multi-vehicle system will be performing a turning maneuver; and generating, on the trailer enhanced view section, a ghost vehicle representing a suggested path for the lead vehicle to perform the turning maneuver, wherein the suggested path is a delayed turning maneuver to avoid obstacles when turning with the trailer vehicle.

18. The HMI system of claim 1, wherein the controller is configured to operate in a reversing maneuver scenario, comprising:

detecting a reverse gear of the lead vehicle is engaged; and displaying the trailer top view section, which provides the top-view graphical representation of the multi-vehicle system with (a) graphical trailer wheels representing an actual orientation of wheels of the trailer vehicle, (b) steering lines showing a path of the trailer vehicle based on the orientation of the trailer wheels, and (c) a graphic indicating a direction to turn the lead vehicle.

19. The HMI system of claim 1, wherein the controller is configured to operate in a jackknife condition scenario, comprising:

detecting a potential jackknife condition;

generating, on the display, a message indicating the potential jackknife condition, and a timeout bar showing allowed elapsed time or distance the multi-vehicle system can travel before an elevated jackknife condition occurs; and generating, on the display, a warning of a jackknife condition when the timeout bar expires.

20. The HMI system of claim 1, wherein the controller is in signal communication with a tow bar system connecting the lead vehicle and the trailer vehicle, the tow bar system comprising:

at least one angle sensor configured to sense a first angle between the lead vehicle and the tow bar system, and a second angle between the trailer system and the tow bar system;

an extension sensor configured to measure a level of extension of the tow bar system; and a load cell configured to sense forces on the tow bar system, wherein the controller is in signal communication with the at least one angle sensor, the extension sensor, and the load cell.

* * * * *